Oct. 23, 1951 G. T. RANDOL 2,572,054
PRESELECTIVE TRANSMISSION CONTROL FOR AUTOMOTIVE VEHICLES
Filed Nov. 22, 1948 12 Sheets-Sheet 1

INVENTOR:
Glenn T. Randol,
BY
Lampher and Van Valkenburgh
ATTORNEYS.

INVENTOR:
Glenn T. Randol,
BY
ATTORNEYS.

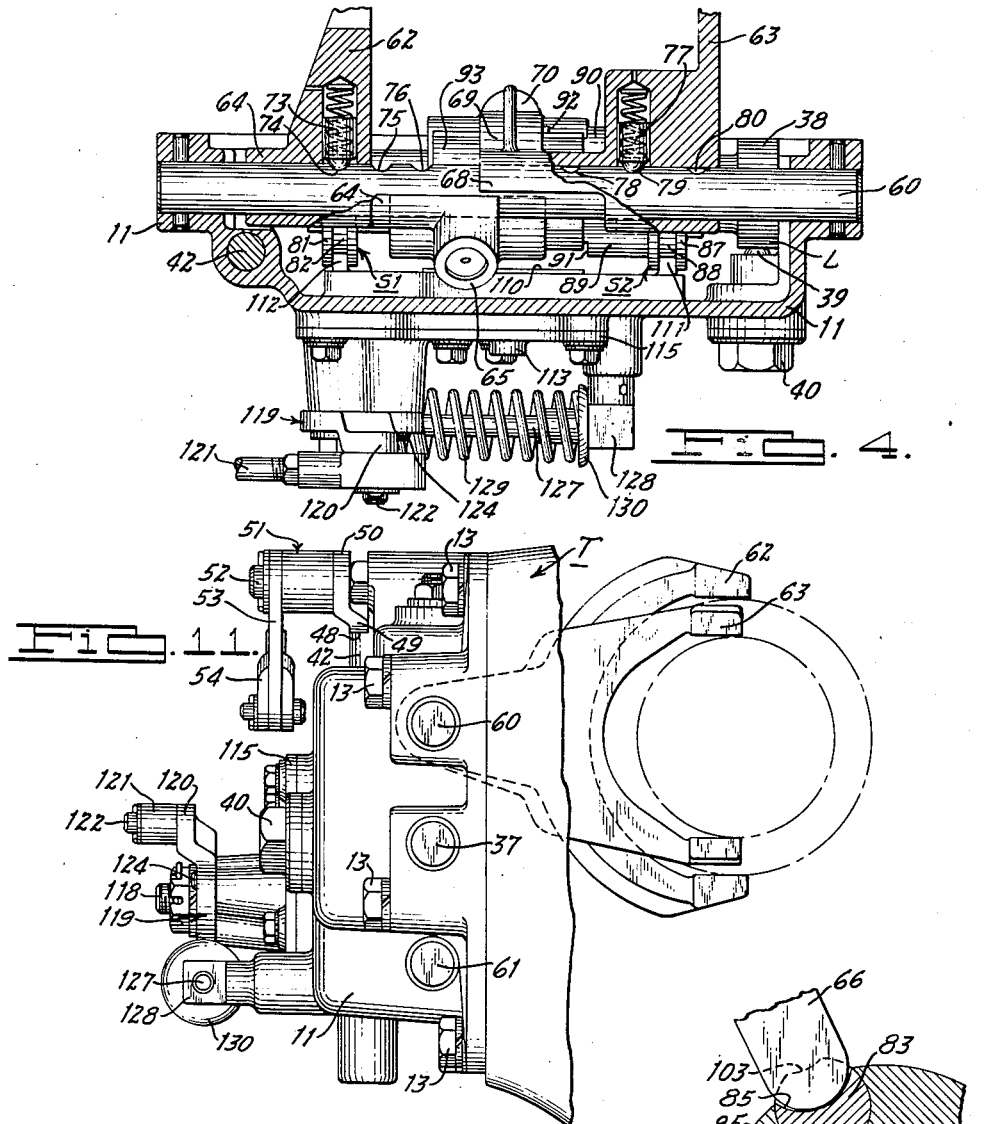
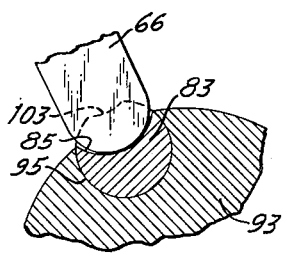
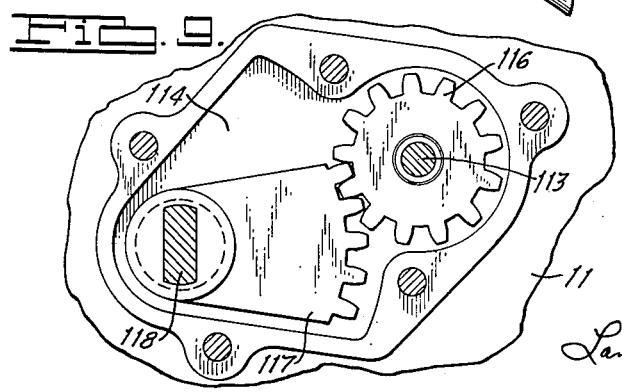
FIG. 4.
FIG. 11.
FIG. 20.
FIG. 9.
INVENTOR:
Glenn T. Randol,
BY Lamphere and Van Valkenburgh
ATTORNEYS.

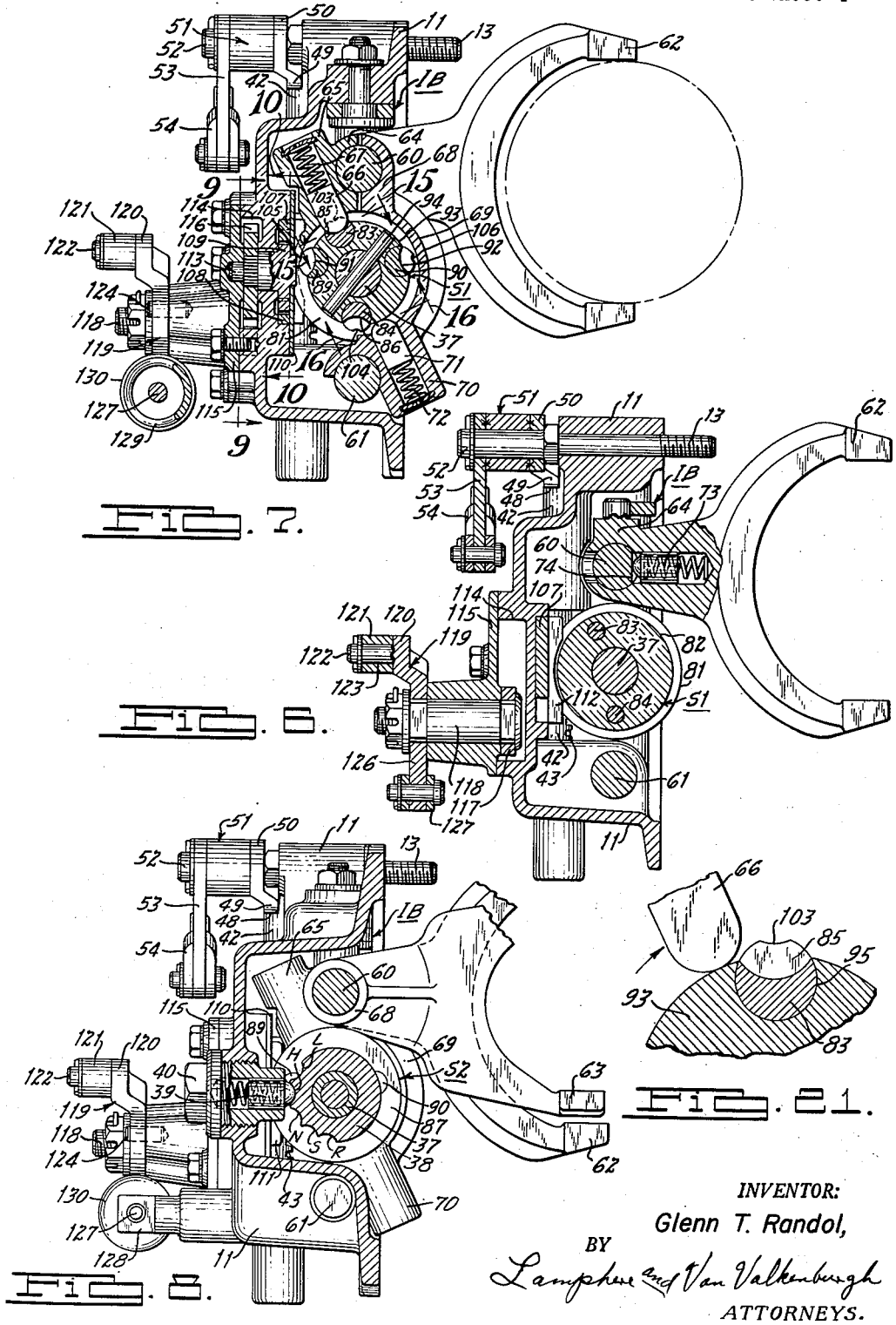

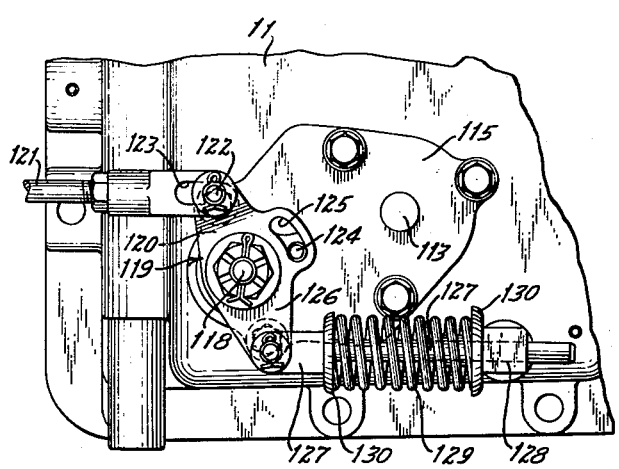
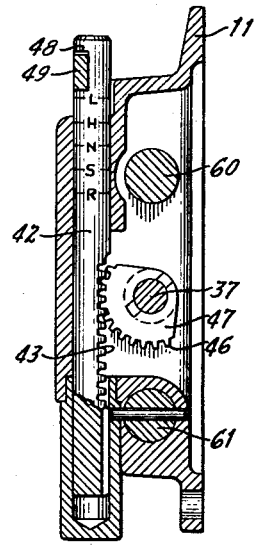
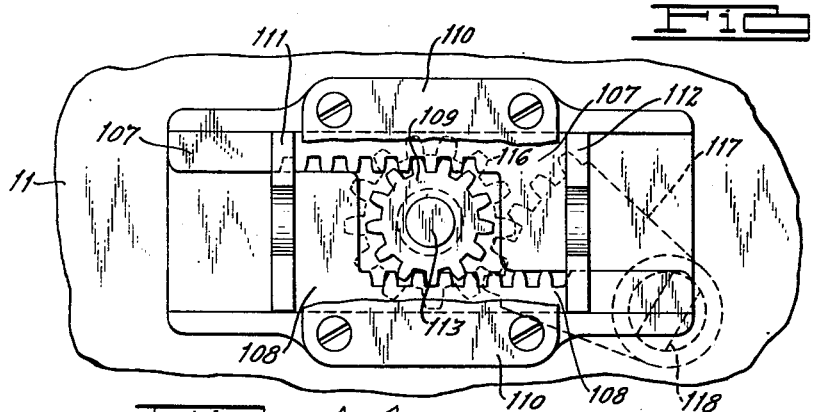
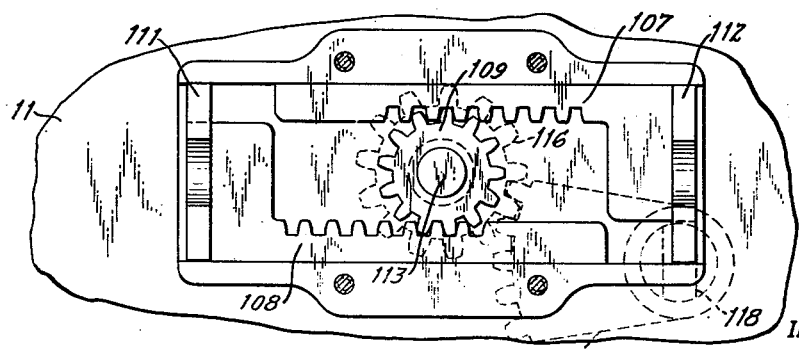

Oct. 23 1951  G. T. RANDOL  2,572,054
PRESELECTIVE TRANSMISSION CONTROL FOR AUTOMOTIVE VEHICLES
Filed Nov. 22, 1948  12 Sheets-Sheet 6

INVENTOR:
Glenn T. Randol,
BY
ATTORNEYS.

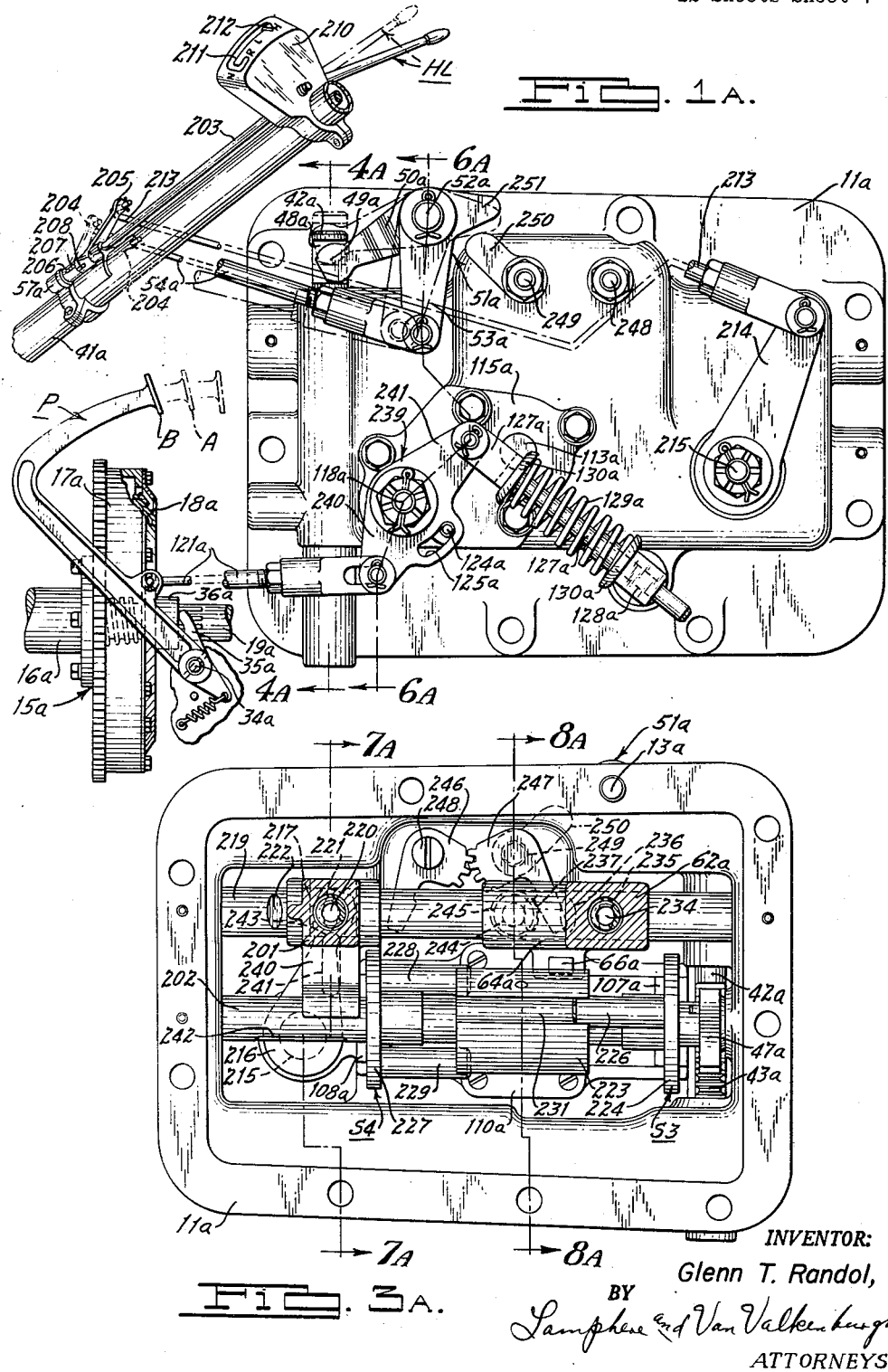

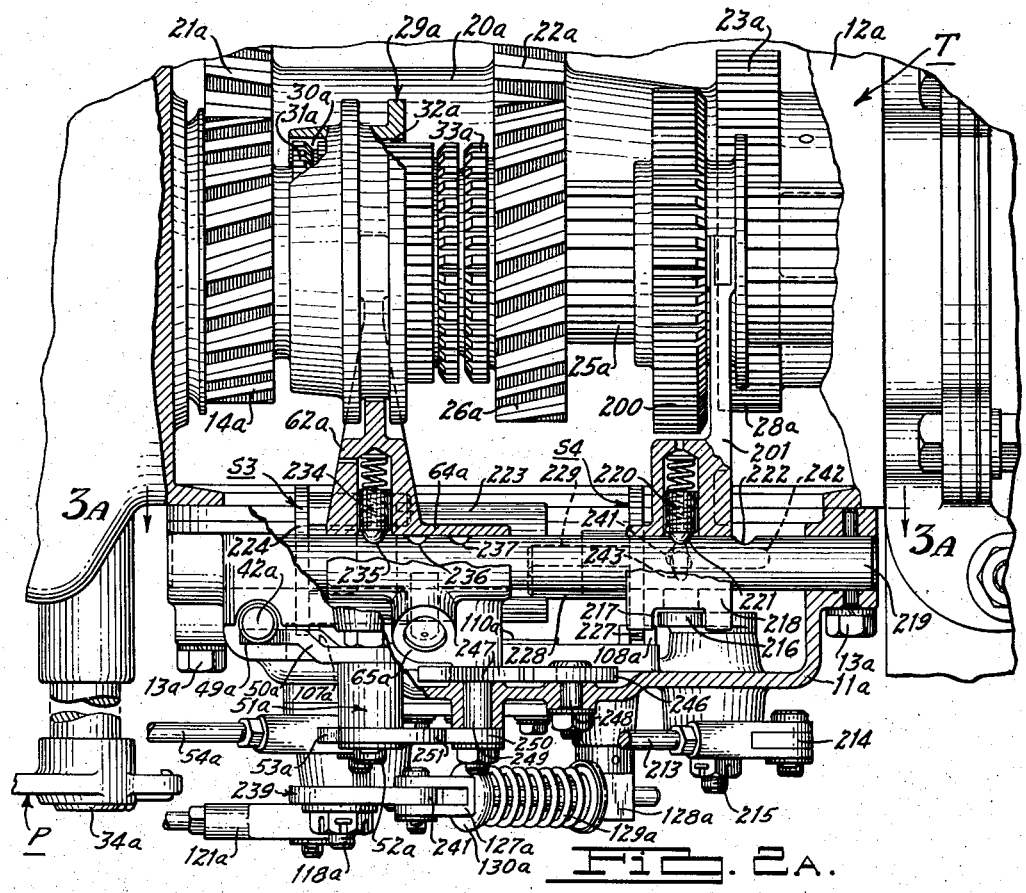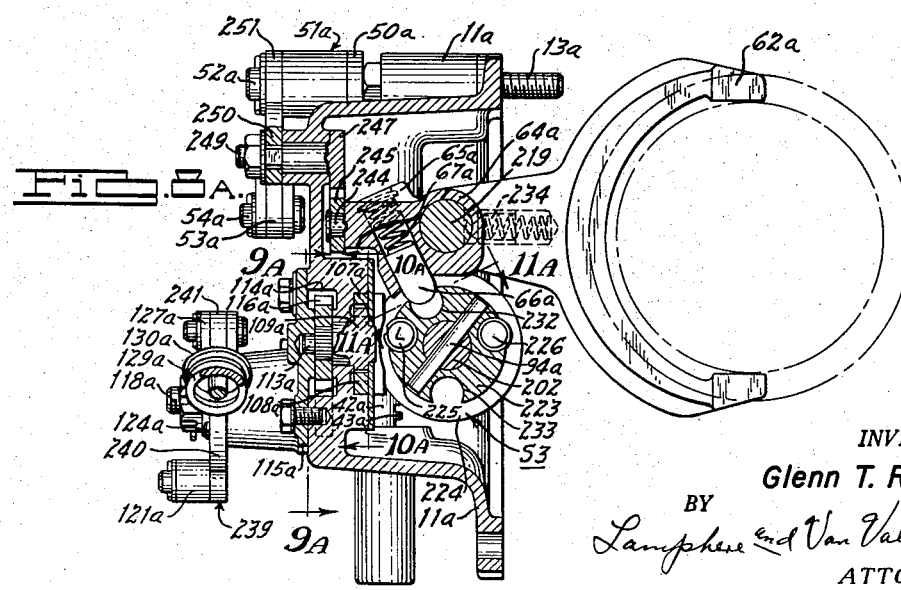

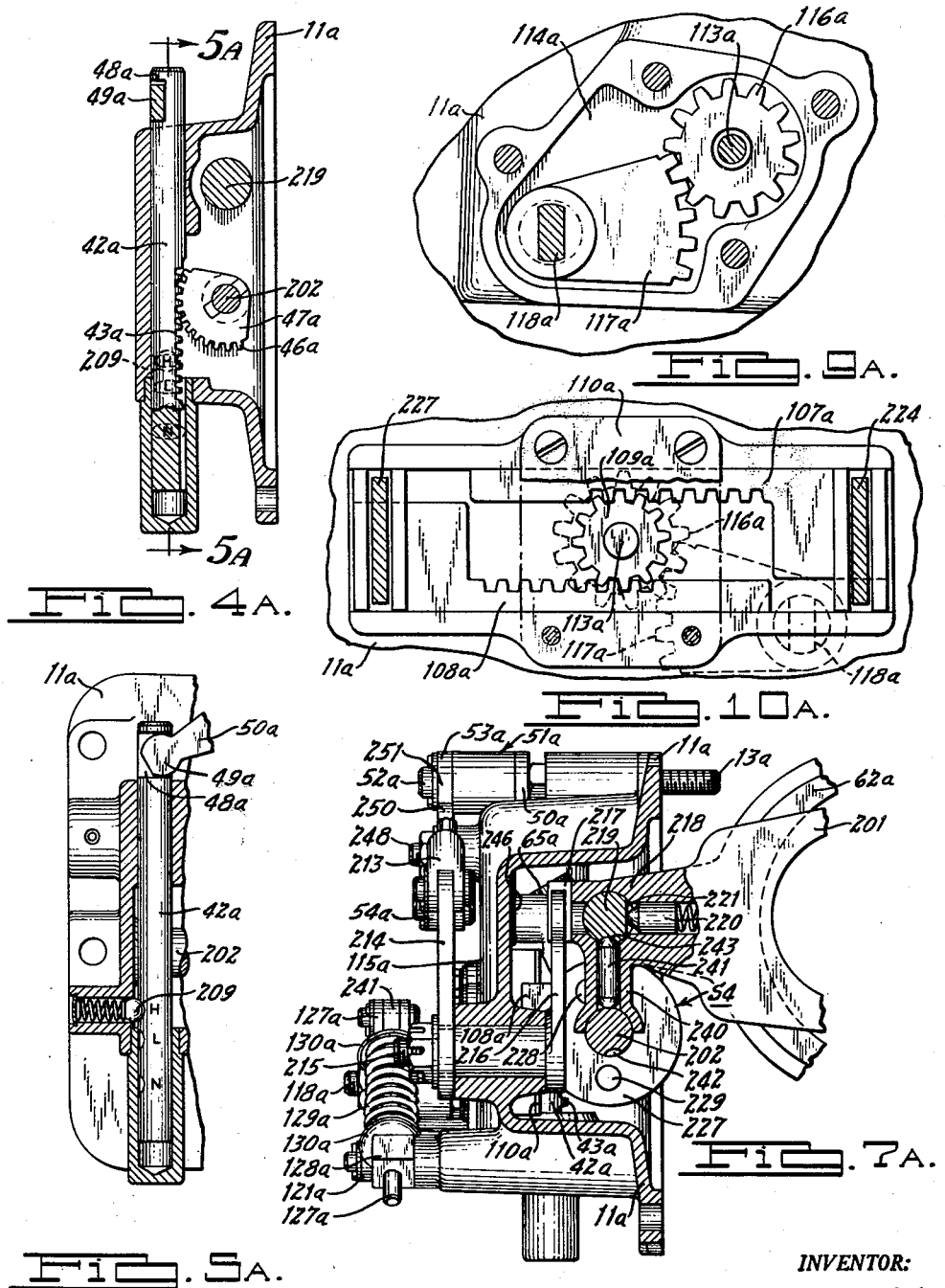

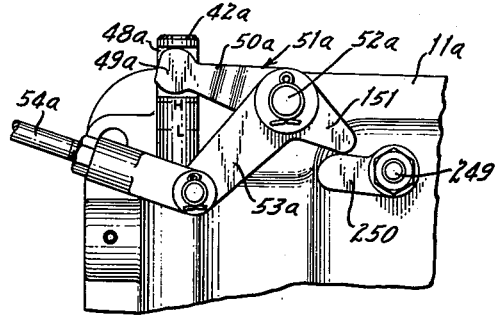
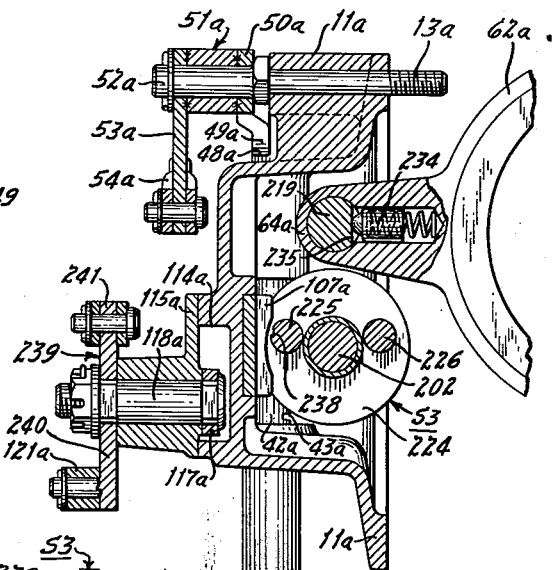
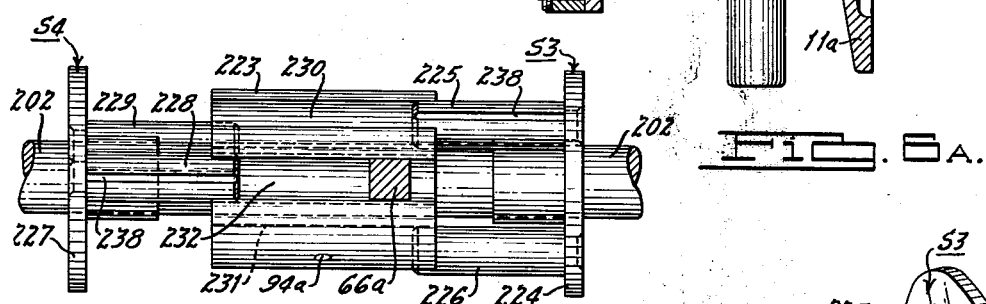
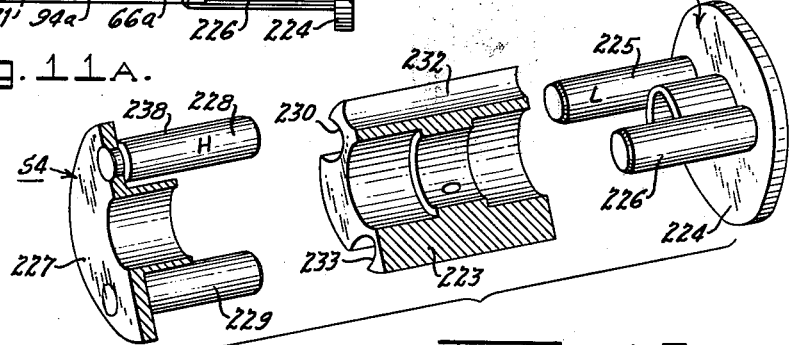
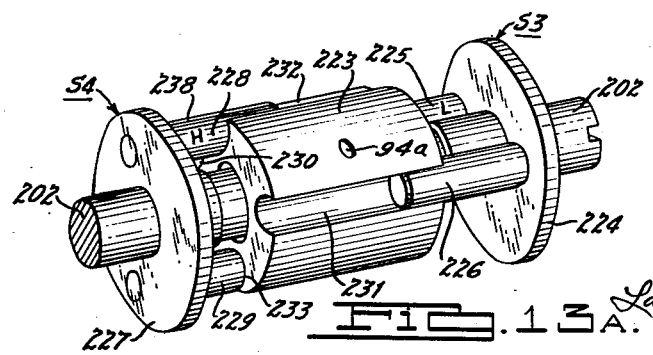

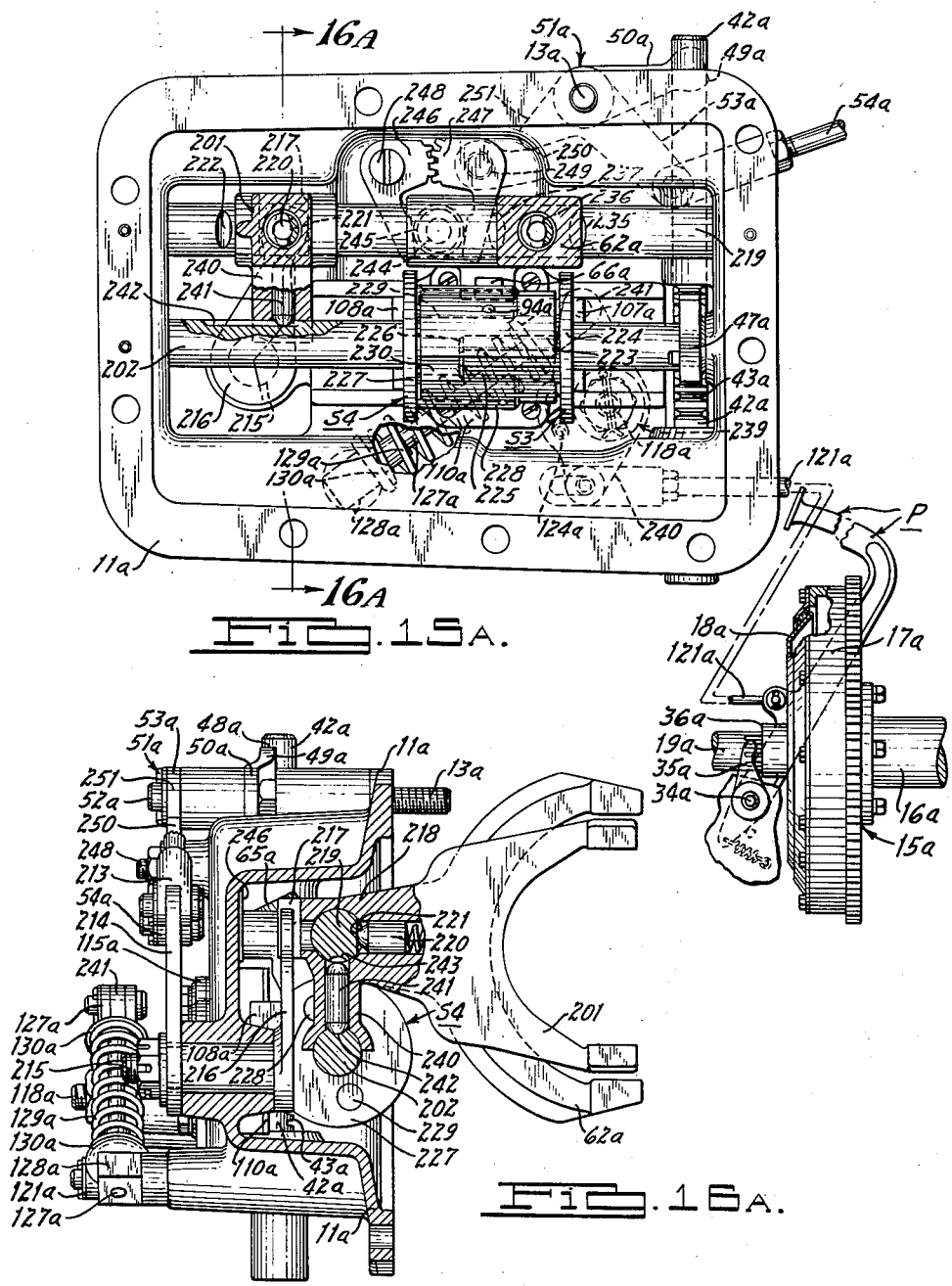

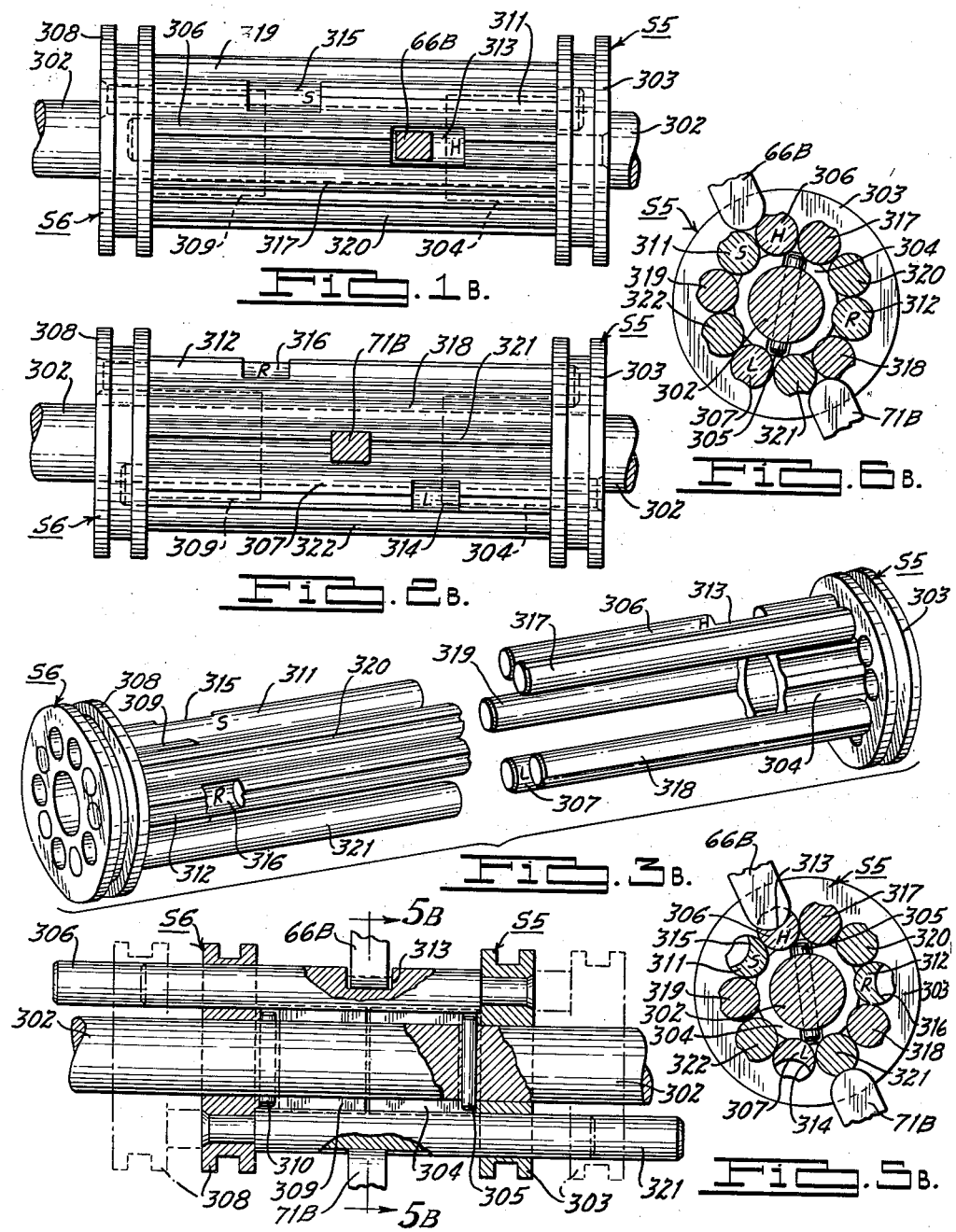

Patented Oct. 23, 1951

2,572,054

UNITED STATES PATENT OFFICE 2,572,054

PRESELECTIVE TRANSMISSION CONTROL
FOR AUTOMOTIVE VEHICLES

Glenn T. Randol, Mountain Lake Park, Md.

Application November 22, 1948, Serial No. 61,325

30 Claims. (Cl. 74—334)

1

This invention relates to control means for a variable speed gear transmission and more particularly an improved preselective control means which will permit unrestricted preselection of a gear ratio. The invention constitutes an improvement in control means of the general character disclosed in my Patent No. 2,126,032, issued August 9, 1938, for "Motor Vehicle Transmission Control."

A general object of the invention is to produce improved rotatable and longitudinally shiftable selector members for a preselective control means for a change-speed transmission which will result in easier selection of desired speeds, and a more positive axial thrust connection for shifting a selected speed gear.

Another object of the invention is to so construct selectors for a preselective control means that the control means can be readily associated with any type of transmission having slidable gears or clutches for establishing multiple unidirectional speeds.

Yet another object is to so construct an assembly of rotatable selectors for a preselective control means such that cooperating connecting plungers carried by shiftable elements of a transmission can be engaged and disengaged from a selector by slight rotative effort, yet will accommodate a stronger and more durable thrust shifting connection therebetween than has heretofore been possible.

A further important object related to that last stated is to provide an improved assembly of rotatable selector members for a preselective transmission control mechanism wherein the cooperating spring-pressed connecting plungers carried by the shiftable elements of the transmission can be disengaged from the selector members by slight rotative effort involving two easy camming stages.

A further object is to so construct selector members for shifting the shiftable members of a change-speed gearing to accomplish preselective control of the speed changes; that cooperating connecting plungers carried by the shiftable members may be received in deeper cross-recesses in the selector members to thus provide increased thrust contact therebetween for shifting the shiftable members thereby, and wherein substantial reduction in the resistance offered by the selector members is also provided when moving them to their different speed selecting positions.

A more specific object is to provide a plurality of circumferentially spaced axially extending

2 rods in overlapping relation and cooperating spring-pressed coupling plungers for selectively connecting shiftable elements thereto for movement therewith when actuated.

Another object related to that last stated is to produce selector members for a preselective transmission control which utilizes round rods as the overlapping selecting fingers with cross slots therein cut to a depth of substantially half the diameter of the rod to thereby provide adequate abutment surfaces for moving a received connecting plunger.

Another important object is to provide an improved preselecting and shifting mechanism of the general character referred to which will enable the largest possible number of transmission conditions to be preselected and established unrestrictedly by a single rotation of the preselective mechanism.

Another object of the invention is to so construct an assembly of selectors for preselecting the different gear drives of a transmission and provide for their cooperation with yieldable connecting plungers that misalignment of the selectors and plungers cannot occur.

A further object is to construct a compact assembly of rotatable selectors which will enable selective connection to be made by a rotative movement with more than two shifter members arranged about the periphery thereof.

A still further object is to provide in a preselective transmission control means improved means for neutralizing the transmission.

Another further object of the invention is to provide an improved preselective control means which will, by operation of a control member, accommodate unrestricted preselection of any speed, regardless of the condition of the change-speed transmission, on establishment of any selected speed by means operable independently of the control member for preselection and a positive neutralization of the transmission by a predetermined conditioning of the preselective control member and without operation of the speed establishing means.

A further object is to provide a preselective control means for a change-speed transmission which will be simple in construction, economical to manufacture and easily associated with existing types of transmissions, and further such a control means which can replace a conventional hand shifting lever and thus provide a vehicle operator with maximum vehicle performance and economy.

Other objects of the invention will become apparent from the following description taken in connection with the accompanying drawing showing several structures embodying said invention.

In the drawings:

Figure 4 is a sectional view taken on the line 4—4 of Figure 1, showing the position of parts when high speed drive is selected and made operative;

Figure 5 is a sectional view taken on the line 5—5 of Figure 1 and showing details of the selector rack and pinion;

Figure 6 is a sectional view taken on the line 6—6 of Figure 1 and showing details of the yieldable positioning detent mechanism associated with the second and high speed shifting fork and also the manner in which a slidable rack is connected to actuate a selector member;

Figure 7 is a sectional view taken on the line 7—7 of Figure 1 and showing details of the shifting fork coupling plungers and the recesses of the selector members positioned in a common selection field, which condition will result by movement of the clutch pedal to its second dash line position as shown in Figure 1;

Figure 8 is a sectional view taken on the line 8—8 of Figure 1 and showing details of the selector positioning detent mechanism;

Figure 9 is a sectional view taken on the line 9—9 of Figure 7 showing the gear drive for actuating the selector members by the operation of the clutch pedal;

Figure 10 is a view of the rack and pinion mechanism as taken on line 10—10 of Figure 7 and showing the position of the parts corresponding to the gear drive condition shown in Figure 9;

Figure 11 is an end elevational view taken from the right end of Figure 1;

Figure 12 is a view showing the position of the external actuating arm in the position assumed when the clutch pedal is depressed;

Figure 14 is a view similar to Figure 10 showing the position of the internal rack and pinion mechanism for actuating the selector members in positions when the clutch pedal is depressed;

Figure 20 is an enlarged fragmentary sectional view of a selector plunger showing the shifting fork coupling plunger engaged in the notch thereof;

Figure 21 is a sectional view similar to Figure 20 but showing the plunger disengaged from the notch when the selectors are rotated in the direction of the arrow;

Figure 1A is a side view of a modification of my improved control mechanism with the parts shown in high speed (direct drive) position, said view also showing the associated steering column selecting lever in a corresponding position and the associated clutch of the motor vehicle in disengaged position with the clutch pedal fully depressed;

Figure 2A is a top view of the mechanism shown in Figure 1 with parts broken away and in section, said mechanism being associated with a conventional two speed forward and reverse synchro-mesh transmission;

Figure 3A is a view taken on the line 3A—3A of Figure 2A showing the parts carried on the inside of the control mechanism housing;

Figure 4A is a sectional view taken on the line 4A—4A of Figure 1A showing details of the selector rack and pinion actuating mechanism;

Figure 5A is a sectional view taken on the line 5A—5A of Figure 4A showing details of the selector rack detent mechanism;

Figure 6A is a sectional view taken on the line 6A—6A of Figure 1A showing details of the detent positioning means associated with the low and high gear shifting fork;

Figure 7A is a sectional view taken on the line 7A—7A of Figure 3A and showing details of the yieldable detent positioning means associated with the reverse gear shifting fork and also the selectively operated interlocking means for insuring the locking of the reverse gear in neutral position when the forward speeds of the transmission gearing are being preselectively controlled;

Figure 8A is a sectional view taken on the line 8A—8A of Figure 3A, showing details of the assembled selectors and the associated yieldable plunger for coupling the low and high gear shifting fork therewith for movement thereby when actuated;

Figure 9A is a view of the gear drive connection as taken on line 9A—9A of Figure 8A and showing the parts in the position corresponding to Figure 1A;

Figure 10A is a view of the internal pinion and rack mechanism for slidably actuating the selectors as viewed on the line 10A—10A of Figure 8A, the parts being in positions corresponding to the gear drive shown in Figure 9A and external arm and actuating means as shown in Figure 1A;

Figure 11A is a view of the modified selectors in assembled condition as viewed from line 11A—11A of Figure 8A;

Figure 12A is an exploded perspective view of the modified selectors shown in Figure 11A; parts being shown in full and partial sections;

Figure 13A is a perspective view of the assembled modified selectors shown in Figures 11A and 12A;

Figure 14A is a view of the upper left hand portion of Figure 1A showing the positions of the external lever connections with the selector rack and neutralizing levers when the selecting lever is set in neutral position;

Figure 15A is a view similar to Figure 3A with an additional showing of a conventional friction clutch of a motor vehicle, the view showing the parts in neutral position with the clutch engaged by release of the clutch pedal;

Figure 16A is a sectional view similar to Figure 7A but showing the selectively operated interlocking means of the reverse gear shifting fork unlocked so that the shifting fork of the reverse gear may be actuated to engage reverse gear and thereby lock the selectors against rotation until such time as the reverse gear has been neutralized;

Figure 1B is a side view of another selector structure in which the armature member is eliminated;

Figure 2B is a view of the same structure as shown in Figure 1B, but looking from the opposite side;

Figure 3B is a perspective view of the two selector members in axially separated positions;

Figure 4B is a view of the selector members showing said members in their innermost positions, parts being in section and broken away;

Figure 5B is a cross sectional view taken on the line 5B—5B of Figure 4B; and

Figure 6B is another cross sectional view similar to Figure 5B, but showing the selector members rotated to a position where the plungers are riding between two rods.

Figures 1, 13:
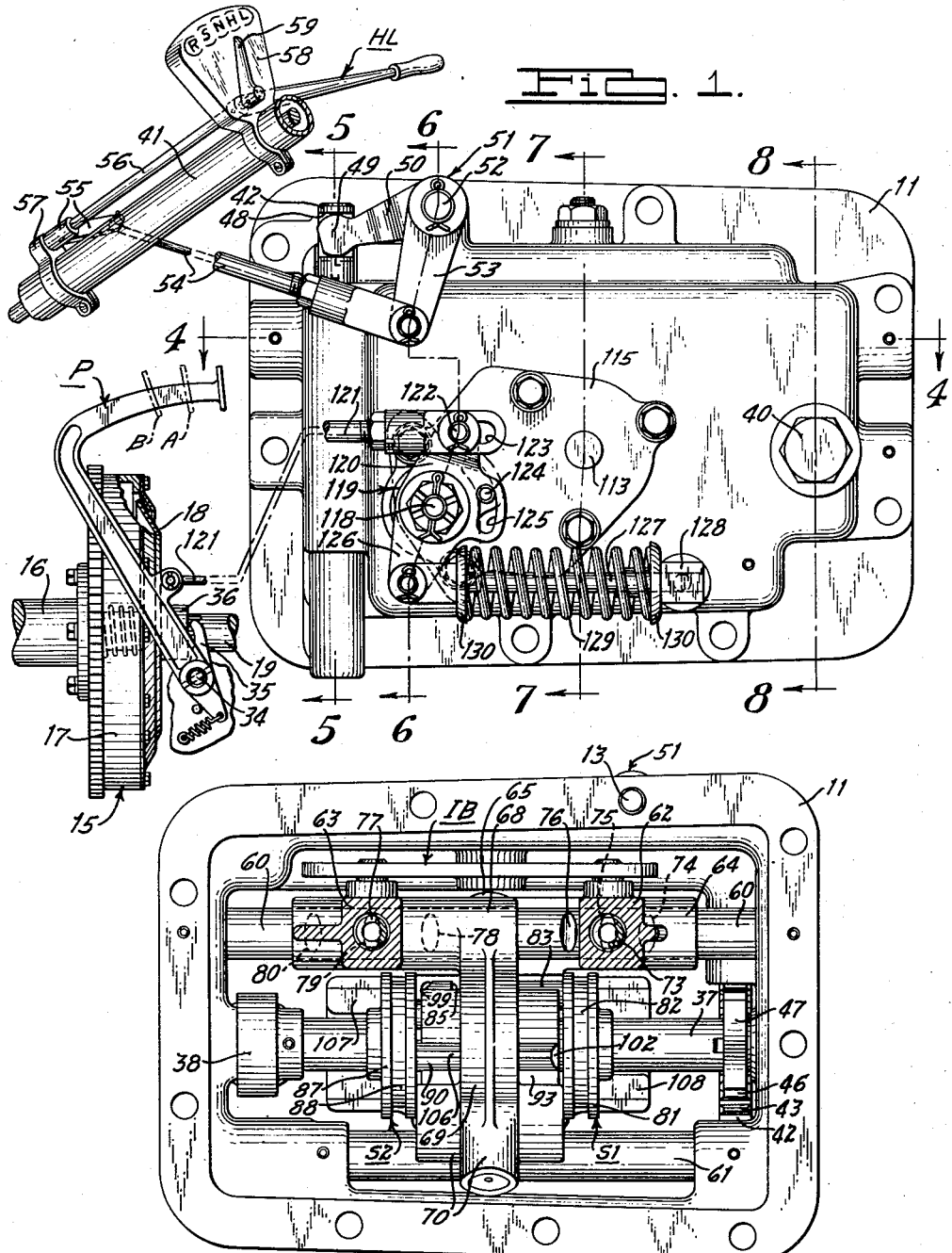
Figure 1 is a side view of a power drive control mechanism embodying my invention, said view showing a motor vehicle friction clutch and steering column selector control associated with a change-speed transmission, the structure shown being conditioned for high speed ratio drive with the clutch engaged.
Figure 13 is a view similar to Figure 3 showing the parts carried on the inside of the control mechanism housing in the positions assumed for neutral condition of the preselection lever with the clutch pedal in its fully depressed position as shown by the second dash lined position of Figure 1.
Figure 2:
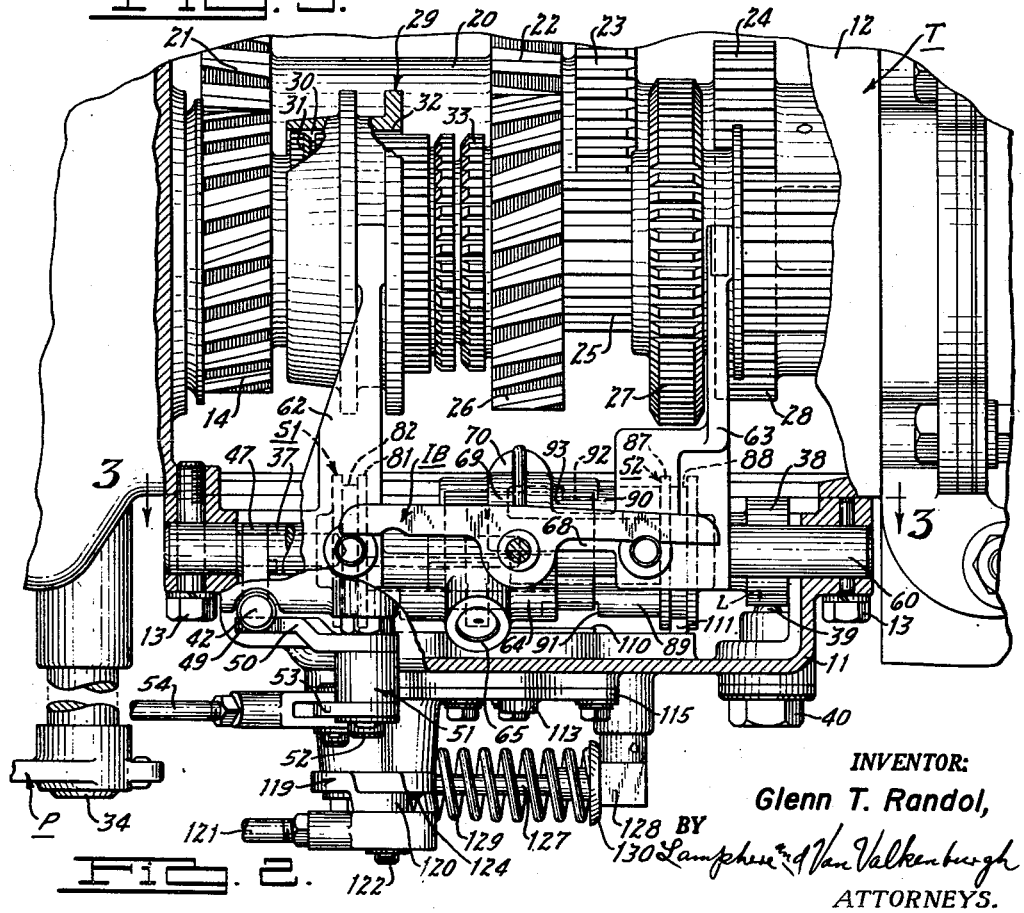
Figure 2 is a view partly in longitudinal section and partly broken away, of the mechanism shown in Figure 1, such mechanism being shown associated with a standard three-speed forward and reverse transmission of conventional design.

Referring to the drawings in detail and first to the control mechanism disclosed in Figures 1 to 22, my improved preselective control mechanism is arranged to be associated with a casing member 11 which takes the place of the usual side mounted cover plate of a change-speed transmission mechanism T enclosed within the housing 12 (Figure 2). The casing 11 is bolted to the housing by bolts 13. The change-speed transmission with which the improved control mechanism is associated is shown in Figure 2 as a conventional standard three speed forward and reverse gearing of the synchro-mesh type and equipped with a horizontally pivoted interlocking bar IB for preventing simultaneous movement of the two gear-shifting forks away from neutral positions. Briefly described, the gearing has a main driving gear 14 at the forward end of the housing 12, this gear being driven through a friction clutch 15 associated with the engine or other power plant of a motor vehicle. The engine crankshaft 16 is connected to drive one element 17 of the clutch 15, and the other and movable element 18 of the clutch is arranged to drive the gearing driving shaft 19 with which is integrally mounted the previously mentioned driving gear 14. The transmission has a countershaft sleeve 20 which is constantly driven from the driving gear 14 by means of a gear 21. The sleeve carries a second speed gear 22, a low speed gear 23 and a reverse gear 24. In alignment with the driving shaft 19 of the gearing is the driven shaft 25, to which is connected the propeller shaft (not shown) of the vehicle for transferring power to the rear driving wheels of the vehicle. The driven shaft of the transmission has rotatively mounted thereon a second speed gear 26 constantly meshing with the countershaft second speed gear 22. At the rear of the gear 26 the driven shaft is splined and slidably mounted on the splines is a combined low and reverse gear 27. The gear 27 is arranged to slidably mesh with the low speed gear 23 on the countershaft to establish low speed drive by sliding movement in forward direction from a neutral position, as shown in Figure 2. When moved rearwardly it meshes with an idling gear 28 which is constantly meshed with reverse gear 24 on the countershaft to establish reverse speed drive. The second speed gear 26 on the driven shaft is spaced from the driving gear 14 and interposed between these gears is a slidable double clutch member 29 splined to the driven shaft.

The double clutch member 29, when moved forwardly as viewed in Figure 2, is arranged to connect the driven shaft directly with the driving shaft for high speed or direct drive, said clutch member 29 having teeth 30 for meshing with teeth 31 integral with the gear 14. When the clutch member is moved rearwardly, clutch teeth 32 thereon will mesh with clutch teeth 33 on the second speed gear 26, to thus connect this gear to the driven shaft and establish second gear drive by way of the countershaft. There is associated with the double clutch member 29 and the clutch teeth 31 and 33 the usual friction type synchronizing means (not shown in detail) whereby smooth engagement of the various clutch teeth is accomplished in a well known manner. The change-speed transmission will be in neutral condition so that no power can be transmitted therethrough whenever the double clutch member 29 is disengaged from the clutch teeth 31 and 33 and when the combined low and reverse gear 27 is disengaged from both low gear 23 and idle gear 28.

In Figure 2 of the drawings the gearing is shown as conditioned for high speed or direct drive. As will be noted, the double clutch member 29 is moved forwardly so as to connect the driving shaft 19 of the gearing directly with the driven shaft of the gearing. The power of the engine can be disconnected from the change-speed transmission at any time by disengaging the engine clutch 15 shown in Figure 1, and this will be accomplished by the usual foot-operated clutch pedal P which, by way of example, also serves as the shift actuator. The power transmitting clutch 15 will be engaged when the clutch pedal is in the full line position shown in Figure 1. When the clutch pedal is moved to the position shown in dashed lines at "A," the clutch will be initially disengaged and when moved to the dashed lines shown at "B" in Figure 1, the clutch will be further disengaged and the additional travel of the clutch pedal will be employed to operate my improved preselective control mechanism to be hereinafter described. The connection between the clutch pedal and the clutch comprises a cross shaft 34 to which the clutch pedal is keyed, and mounted on this shaft is a clutch releasing fork 35 for engaging the collar 36 of the movable element 18 of the main clutch.

The casing member 11 is of general rectangular cup-shape in form and positioned longitudinally therein so as to extend across the hollow portion is a selector shaft 37 journaled at its opposite ends in the casing. This shaft is arranged to be rotated to five different positions to preselectively control the condition of the gearing for reverse, low, second and high speeds, and neutral, that is, the inoperative condition of the gearing. To readily locate these positions there is provided a yieldable detent mechanism for association with the rear end of the shaft. As best shown in Figure 8, the shaft has pinned thereto a collar 38, provided with five peripheral circumferentially spaced recesses designated as "L," "H," "N," "S" and "R," to thus indicate the five selective conditions of the gearing. Cooperating with these recesses is a spring-biased round-headed detent 39 mounted in a bore of the casing member closed by a threaded plug 40.

The shaft 37 is arranged to be rotated to its five different positions by means of a hand lever HL which is mounted on the steering column 41 of the vehicle, as shown in Figure 1. The connection for rotating said shaft by operation of the handle HL embodies a slidable rack 42 mounted in the forward part of the casing member and arranged to be at right angles to the shaft. The teeth 43 of this rack (see Figure 5) mesh with teeth 46 of a sector gear 47 secured to the forward end of the shaft 37. The rack extends out of the upper side of the casing member 11 and is provided at its outer end with a slot 48. This slot receives the rounded end 49 of one arm 50 of a bell-crank lever 51 which is pivotally mounted to the upper exterior portion of the casing member by a pivot pin 52. The other arm 53 of this bell-crank lever, as best shown in Figure 1, is connected by means of a link 54 to the outer end of an arm 55 secured to the lower end of a shaft 56 positioned parallel to the steering column. The lower end of this shaft 56 is journaled in a bracket 57 attached to the steering column, and the upper end is journaled in the indicating plate 58 attached to the upper end of the steering column just beneath the steering wheel (not shown). The shaft 56 is arranged to extend above the indicating plate and has provided on this end a pointer 59 to indicate the various positions of the selector shaft of the control mechanism. These positions are shown in Figure 1 by the letters "R," "S," "N," "H" and "L" for the five conditions of the gearing. The shaft 56, just below the plate, has secured to it the hand lever HL, already referred to. Whenever the pointer is opposite any of the letters on the indicating plate, the shaft will be so positioned that the previously referred to detent 39 will be resting in a correspondingly marked recess in the collar 38 carried by the selector shaft and, as will become apparent, the indicated condition of the transmission will be preselected or established.

Also mounted in the casing member 11 on opposite sides of the selector shaft 37 are two rods 60 and 61, said rods being mounted in the ends of the casing member and pinned thereto so as to be non-rotatable. The upper rod 60 is arranged to have slidably mounted thereon the two shifting forks 62 and 63 for controlling the two slidable speed ratio changing members of the change-speed transmission, namely, the slidable double clutch member 29 and the combined low and reverse gear 27. The shifting fork 62 controls the clutch member 29 and the shifting fork 63 controls the slidable gear 27, all as best shown in Figure 2. The shifting fork 62 is slidably mounted on the forward portion of rod 60 by means of hub 64 which has an angular integral boss 65 in a bore of which is mounted a selector connecting plunger 66 backed by a coil spring 67. The axis of the plunger is arranged to be radial with respect to the axis of the selector shaft 37. The shifting fork 63 has a hub 68 which is slidable on the rear portion of rod 60 and a semi-cylindrical extension portion 69 projects around the selector shaft 37 and has sliding support on the other rod 61 by a curved end 70 as can be best seen in Figure 7. The outer end of the semi-cylindrical extension adjacent the rod 61 is formed with a bore radial with respect to the axis of the selector shaft, and within this bore is a plunger 71 backed by a spring 72. The plunger 71 is arranged to be diametrically opposite the plunger 66 to thus produce a balanced assembly. Each shifting fork has three positions to perform its function and, in order that these three positions may be readily located, the shifting fork 62 for the slidable double clutch member 29 carries a spring-biased detent 73 which is arranged to cooperate with three recesses 74, 75 and 76 in the rod 60. Similarly, the shifting fork 63 for the combined low and reverse speed gear 27 carries a spring-biased detent 77 which is arranged to cooperate with three recesses 78, 79 and 80 in the rod 60. The locating detents for the shifting forks in the recesses of the rod are variously shown in Figures 3, 4, 6 and 13.

The rotatable selector shaft 37 carries two selector members generally indicated by the letters $S^1$ and $S^2$, said members being shown in detail in Figures 15, 16, 17, 18 and 19. These selector members are arranged to be slidable longitudinally on the axis of the shaft in opposite directions, both toward and away from each other, and, as will be presently described, said selector members are also arranged to be rotatable in unison with the selector shaft 37.

Selector member $S^1$ comprises a collar 81 slidable on shaft 37 and provided with an annular groove 82. From this collar there extends inwardly, in an axial direction, two round rods 83 and 84, said rods being spaced so as to be on opposite sides of the axis of the collar. Rod 83 is provided with a slot 85 and rod 84 is provided with a slot 86, said slot 85 being arranged to receive the plunger 66 and the slot 86 being arranged to receive plunger 71 whenever these rods are rotated to positions opposite the plungers. The selector member $S^2$ is similar to the selector member $S^1$, comprising a collar 87 slidable on shaft 37 and having a peripheral groove 88. From the collar two round rods 89 and 90 extend inwardly in an axial direction. The rod 89 has a slot 91 for receiving the plunger 66 and the rod 90 has a slot 92 for receiving the plunger 71. Rods 89 and 90 are arranged to extend between the rods 83 and 84 of selector $S^1$ and all the rods are arranged to be in a circle which surrounds the selector shaft 37.

In order that the selector members can be rotated by the selector shaft, there is provided a cylindrical collar, to be referred to as an armature member 93, which is secured to the selector shaft by a pin 94. This armature member has four axially extending grooves in its surface, said grooves being slightly greater in curvature than a semi-cylinder indicated by the numerals 95, 96, 97 and 98. The grooves are of such size as to slidably receive the four rods, with rod 83 received in groove 95, rod 89 received in groove 96, rod 84 received in groove 97 and rod 90 received in groove 98, all as shown in Figures 15, 16, 18 and 19.

When the selector members are in their innermost position, the slots of the various rods will be in circular alignment. When the selector members are moved outwardly with respect to each other, the rods will still remain in the grooves of the armature member, but the slots in the rods 83 and 84 will be moved outwardly in one direction from the circular alignment field and the slots in the rods 89 and 90 will be moved outwardly in the opposite direction from the circular alignment field.

The end of each rod is beveled, said rod 83 having a beveled end 99, rod 84 having a beveled end 100, rod 89 a beveled end 101 and rod 90 a beveled end 102. The purpose of the bevels is to enable the rods to slide under a plunger in the event the plunger should be axially aligned with a rod and spaced outwardly from the end thereof, as is a condition that occurs during preselection prior to shifting. The rods of the various selector members are also provided with axially extending grooves on their exposed surfaces, said rod 83 having the groove 103, rod 84 the groove 104, rod 89 the groove 105 and rod 90 the groove 106. These grooves are provided to enable a plunger to ride on the surface of a rod without producing forces tending to rotate the selector members and the selector shaft 37, or to shift out of alignment with a rod and its slot.

In connection with the selector members and the shifting forks it is to be noted that the collars 81 and 87 not only function to support the rods, but also are employed to neutralize the shifting forks 62 and 63. The hubs of the shifting forks have an axial length equal to the distance between the collars of the selector members when said members are in their innermost positions and said hubs are arranged to project into the axial path of movement of the collars. Thus, when a shifting fork is in any position establishing a gear ratio, then upon movement of the selector members from their outermost positions (see Figure 3) to their innermost positions (see Figure 13) the shifting fork will be engaged by a selector member collar and moved to its neutral position. By this arrangement neutralization of the transmission will always be insured whenever the selector members are moved to their innermost positions.

As already mentioned, the selector members are to be moved inwardly simultaneously toward each other and also outwardly away from each other simultaneously. To accomplish this, the casing member 11 has mounted therein two companion racks 107 and 108, shown in detail in Figures 10 and 14. The teeth of both racks mesh with a gear 109, the teeth of rack 107 meshing on one side of the gear and the teeth of rack 108 meshing on the other side of the gear. The racks are arranged to slide in a shallow trough in the casing member, said trough being opposite the selector shaft and selector members. A plate 110 maintains the racks in the trough for sliding movement. The rack 108 carries a projection 111 which is received in the peripheral groove 88 of the collar of the selector member $S^2$, and the rack 107 carries a similar projection 112 arranged to be received in the peripheral groove 82 of the collar of selector member $S^1$. The rack operating gear 109 is secured to a shaft 113 journaled in the casing member 11 and extending into a chamber 114 closed by a cover 115. The portion of the shaft 113 in the chamber 114 has secured thereto another gear 116, and this gear is arranged to have meshing engagement with teeth of a selector gear 117 secured to a shaft 118 journaled in a boss of the previously mentioned plate 115 which covers the chamber 114. Thus, it will be seen, by oscillating the shaft 118 and with it the sector gear 117, the gears 116 and 109 will be oscillated and consequently the racks 107 and 108 so moved that the projections 111 and 112, respectively, will be moved simultaneously away from or toward each other. Figure 10 shows the racks moved outwardly and Figure 14 shows the racks moved inwardly. Since the racks are connected to selector members, these members will have corresponding inward or outward movement, depending upon the direction of rotation of the gear 109.

Shaft 118 on its outer end has secured thereto a double arm lever 119. The upper arm 120 of this lever is connected by a link 121 with the clutch pedal P, already referred to and shown in Figure 1. The connection between the link 121 and the arm 120 is made by means of a pin 122 in the arm and a slot 123 in the end of the link, thus providing a lost motion connection. The lost motion is sufficient to allow free movement of the rod by clutch pedal P without operating the arm 119 so that the pedal can be moved from its full line position shown in Figure 1 to the dotted line position "A," also shown in Figure 1, and thus allow for disengagement of the friction clutch before there is any movement of the arm 119. When the pedal P is moved from the position "A" to the position "B," the arm 119 will be moved and, consequently, the gear 109 rotated in a counterclockwise direction from the position shown in Figure 10 to the position shown in Figure 14, with the result that the racks will move the two selector members inwardly. The extent of movement of the arm 119 is limited by means of a pin 124 carried on the plate 115 and received in an arcuate slot 125 at the hub of the double arm lever 119.

The other arm 126 of the double arm lever 119 extends in a direction opposite from the arm 120. Connected to this arm is a rod 127 which is arranged to slide in a pivoted abutment 128 carried on the exterior of the casing member 11. Surrounding the rod is a relatively powerful coil spring 129, the ends of which are arranged to seat in cups 130, one of which abuts against the abutment 128 and the other cup is arranged to abut against a shoulder on the rod adjacent its end connected with the arm 126. With this arrangement, it is seen that when the double arm lever 119 is rotated by the clutch pedal to thus move the selector members inwardly, the strong spring 129 will be compressed and energy will be stored up. When the clutch pedal P is released and allowed to move from position "B" to position "A," the spring 129 will expand rapidly and move the double arm lever 119 in a reverse direction, which will result in the gear 109 being rotated in a counter-clockwise direction from the position shown in Figure 14 to the position shown in Figure 10, thereby causing the selector members to move outwardly. The stop pin 124 extends into the arcuate slot 125 to limit the extent of rotation of double arm lever 119 by the clutch pedal in one direction and by the spring 129 in the other direction.

Operation of control mechanism shown in Figures 1 to 22

From the foregoing detailed description of the structure comprising my improved control mechanism, the manner of control of the transmission, although believed to be apparent, will be briefly described. In connection with the controlling of the transmission it is to be noted that the selector member $S^1$ will be employed to select and establish high and low speeds, and the selector member $S^2$ will be employed to select and establish second and reverse speeds. The rods of the selector members and the plungers are so arranged that only one plunger can be connected to a selector member at any time. The plunger 66 is capable of cooperating only with the slots in the rods 83 and 89 and the plunger 71 is capable of cooperating only with the slots in the rods 84 and 90. This cooperative relationship results from the rotating of the selector members by the selector shaft and the hand lever HL in a limited manner. When the selector members are rotated so that the plunger 66 is capable of cooperating with the slot 85 in the rod 83, high speed will be selected and this will be indicated by the positioning of the hand lever so that the pointer indicates "H" on the indicating plate. The plunger 66 will be capable of cooperating with the slot 91 in the rod 89 when the hand lever is positioned so that the pointer indicates "S" on the indicating plate. The plunger 71 will be able to cooperate with the slot 86 in the rod 84 when the hand lever is positioned so that the pointer indicates "L" on the indicating plate. Also, the plunger 71 will be capable of cooperating with the slot 92 in the rod 90 when the hand lever is placed in a position so that the pointer indicates "R" on the indicating plate. When the hand lever is in a position so that the pointer indicates "N" on the indicia plate, neither of the plungers 66 nor 71 will be in a position where it can cooperate with a slot in any of the rods. Under such conditions the plunger 66 will be riding on the armature member between the rods 83 and 89 and the plunger 71 will be riding on the armature member between the rods 84 and 90.

Figure 3:
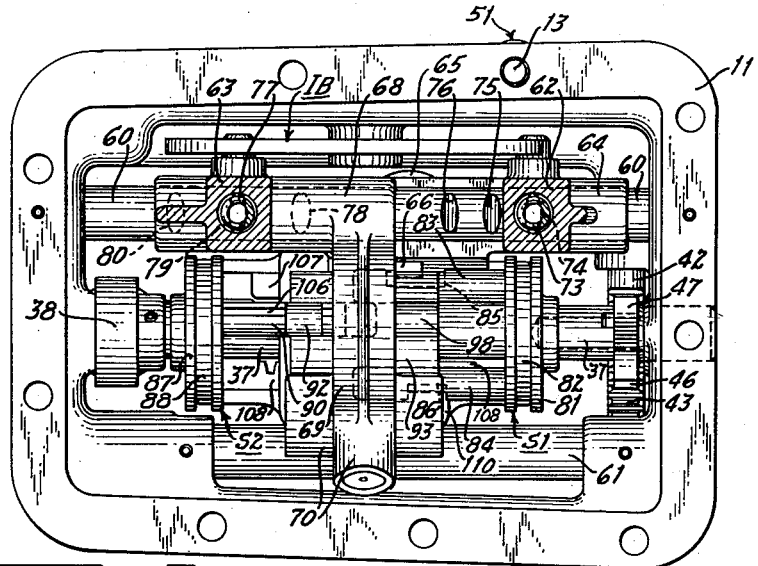
Figure 3 is a view taken on the line 3—3 of Figure 2, showing the parts on the interior of the control mechanism housing.
Figure 15:
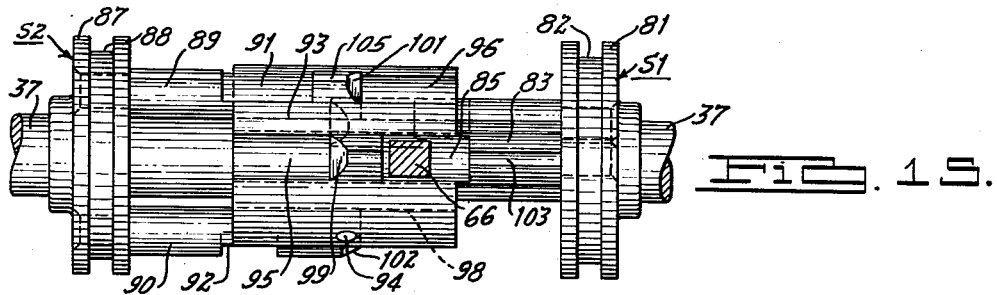
Figure 15 is a view of the assembled selectors as taken from the line 15—15 of Figure 7.
Figure 16:
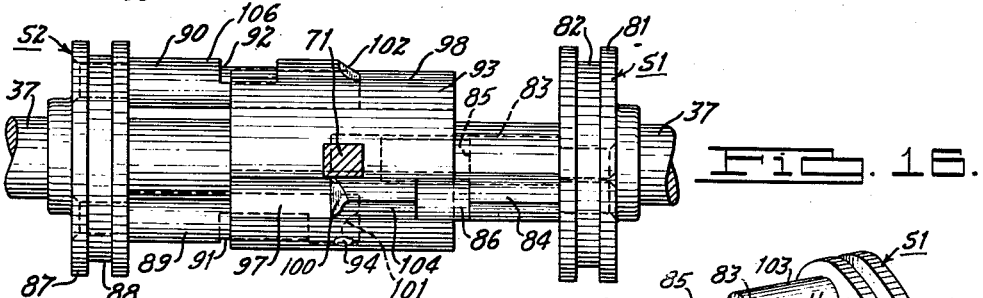
Figure 16 is another view of the assembled selector as taken from the line 16—16 of Figure 7.
Figure 17:
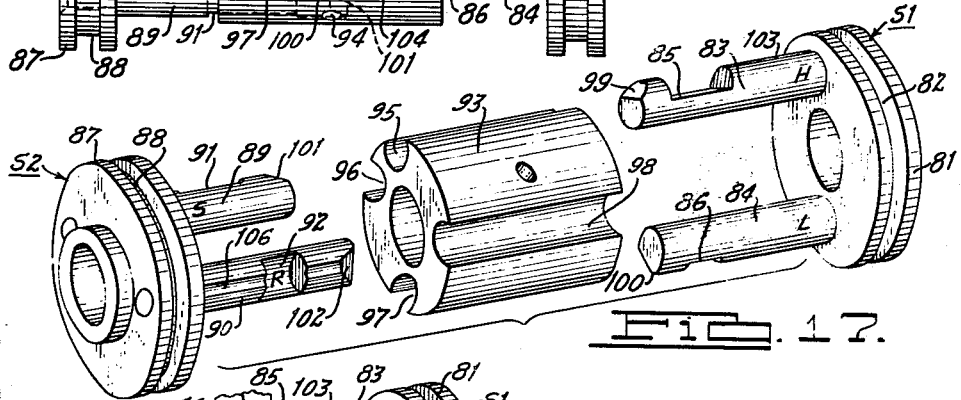
Figure 17 is an exploded perspective view of the selectors and the grooved collar shown in Figures 15 and 16.
Figure 18:
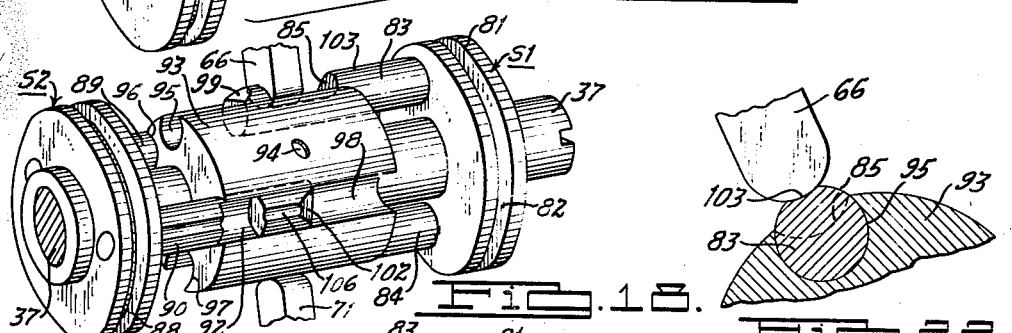
Figure 18 is a perspective view of the assembled selectors in their positions as shown in Figures 1, 2, 3, 4 and 15 where high speed is active.

Whenever the clutch pedal P is released to control the clutch 15 into engaged condition, it will so control the selector members that said members will be in their outermost positions, that is, they will be spread apart to the fullest extent, as is shown in Figures 3, 15 and 16, for example. When the clutch pedal P is depressed to its fullest extent, that is, to the position "B" indicated in Figure 1, the clutch will be first disengaged and then the selector members will be moved inwardly to their fullest extent, such inward position being shown for example in Figure 13. Fully depressing the clutch pedal will also result in the spring 129 being compressed, but only after clutch disengagement. If the clutch pedal should now be released, spring 129 will expand and as a result thereof the selector members will be moved outwardly, thus returning to their spread apart position.

In further respect to the operation of the control mechanism, let it first be assumed that the hand lever HL is in a position where the pointer indicates "N." Under such conditions the transmission gearing is selected for neutral. The gearing may be actually in neutral condition if the clutch pedal had been moved to the "B" position either prior to the hand lever being moved to the "N" position or after the hand lever is moved to the "N" position.

If the gearing is conditioned so that a speed is established at the time the hand lever is moved to the "N" position with the clutch remaining engaged, that is, without depressing the clutch pedal, then there will only be a pre-selection of neutral without an establishment thereof. Suppose, for example, the lever were in the "H" position prior to its being moved to the "N" position, and high speed is established. Under such conditions the shifting fork 62 would be in the position shown in Figures 2 and 3 and the plunger 66 carried by the shifting fork 62 would be in the slot 85 of the rod 83, all as indicated in Figure 7. Now, by the placing of the hand lever in the "N" position, the selector members will be rotated so that the plunger 66 will be moved out of the slot 85 of the rod 83 and up onto the surface of the armature between the rods 83 and 89. When the clutch pedal is fully depressed to the "B" position, the selector members will have been moved inwardly to their fullest extent. As the selector members are moved inwardly the collar on selector member $S^1$ will engage the hub of the shifting fork 62 and thus carry it inwardly so that the double clutch element 29 will be declutched from the teeth on the driving gear 14 of the transmission. When the clutch pedal is released and the selector members again caused to move outwardly by action of spring 129, the gearing will remain in neutral since the plunger 66 is riding on the surface of the armature member between the rods 83 and 89. If the clutch pedal P had been fully depressed to the position "B" and held in such position before the hand lever HL had been moved to the "N" position from the "H" position, then the gearing would have been neutralized by the clutch pedal movement in the manner described, with the plunger 66 remaining in the slot 85 of rod 83. The gearing is caused to remain in neutral after the hand lever HL is moved to the "N" position.

Regardless of the condition of the transmission gearing, any other condition of the transmission gearing can always be pre-selected at any time without any restriction whatsoever. If the gearing should be in neutral, for example, and low speed is desired, the hand lever will be moved to the "L" position. This will cause such a rotation of the selector members and the armature member as to place the rod 84 of the selector member $S^1$ underneath the plunger 71. As the selector and armature are rotated, the plunger 71 will first ride on the surface of the armature member until it comes to the rod 84 and then the plunger will yield and ride up onto rod 84. The slot 86 of the rod 84 will not be opposite the plunger 71 when the plunger is up on the rod since the clutch pedal has not yet been depressed to move the selectors to their spread apart position. Figure 16 shows the position of the plunger 71 before the selectors are rotated and before the plunger is caused to be placed on rod 84. As the hand lever is rotated to the "L" position, then the exposed cylindrical surface 84 engages the plunger and cams it upwardly onto the rod where it comes to rest in the groove 104 on said rod. The low speed has now been pre-selected.

To establish this pre-selected speed, all that needs to be done is to fully depress the clutch pedal to the position "B," beyond the disengaged condition of the clutch, and then release the clutch pedal. As a result thereof the selector members S¹ and S² will be first moved toward each other and to their innermost positions during depressing of the clutch pedal. As the selector member S¹ moves inwardly, the rod 84 will slide axially underneath the plunger 71 and when it reaches its innermost position said plunger will drop into slot 86 in said rod. During subsequent release of the clutch pedal the selector members will be caused to move apart by action of the power spring 129, prior to engagement of the clutch, and consequently the selector member S¹ will carry with it the plunger 71 since it is engaged in the slot 86. This axial movement of the plunger 71 will cause shifting of the fork 63 forwardly and thus establish low speed by meshing gear 27 with countershaft gear 23.

If the gearing should be in low speed and second speed should be desired, this speed can be pre-selected in an unrestricted manner merely by moving the hand lever HL to the "S" position. When the hand lever is moved to the "S" position, the selector members and the armature member will be rotated to such a position that the plunger 66 will project into groove 96 of the armature member ahead of the rod 89 of selector member S² due to the fact that the selector members are spaced apart, the clutch pedal not having yet been fully depressed. When the selector members are rotated from the "L" position to the "S" position, the plunger 71 which was in the slot 86 will be disengaged from said slot and will ride back onto the surface of the armature member 93, thus disconnecting the rod 84 from the shifting fork 63.

To establish the pre-selected second speed, the clutch pedal will now be fully depressed and released. Depressing the clutch pedal will bring the selector members to their innermost positions and as the selector member S¹ moves inwardly its collar will engage the hub of the shifting fork 63 and carry it inwardly so as to disengage the gear 27 from the countershaft gear 23. As the selector member S² moves inwardly the rod 89 thereof will slide beneath the plunger 66 which is facilitated by beveled end 100, and when the selector member reaches its innermost position, the plunger 66 will drop into the slot 91. The plunger 66 will thus connect the shifting fork to the selector member S² for subsequent sliding movement therewith at the time the low speed is neutralized. When the clutch pedal is released, the selector members will be moved apart by spring 129 and as the selector member S² moves outwardly it will carry with it shifting fork 62. The double clutch member 29 of the transmission gearing will thus be moved rearwardly and clutch the gear 26 to the driven shaft 25 and establish second speed.

If pre-selection should not be desired, then of course an established gear, such as the low speed, can be neutralized by depressing the clutch pedal and then, while the clutch pedal is fully depressed, the hand lever HL can be set to the "S" position. This setting of the hand lever will result in the armature and selecting members being rotated so that the plunger 66 will drop into the slot 91 of rod 89. It will be noted that when the clutch pedal is depressed, the selector members will be in their innermost position and thus, as these selector members are rotated, the slot 91 will be in circular alignment with the plunger 66 and thus the plunger can move directly into the slot from off the armature surface as the armature is rotated. When the clutch pedal is released, the selector member S² will be connected with the shifting fork 62 and as it moves outwardly it will establish the second speed.

If second speed should be established and it is desired to pre-select high speed, this will be accomplished by merely moving the hand lever HL to the "H" position without fully depressing the clutch pedal. Such will rotate the selector members and the armature member so that the plunger 66 will be cammed out of the slot 91 onto the surface of the armature member and then drop into the groove 95 of the armature forward of the end of the rod 83 of the selector member S¹. It will be noted that when the second speed is established and the friction clutch 15 engaged, the selector members S¹ and S² will be spread apart and, consequently, the plunger 66 will be in such a position with respect to the position of the rod 83 that it cannot ride up onto the rod 83, but must drop into the groove 95 in the armature member. The rounded end of the plunger 66 will engage the top edges of the groove 95 as the plunger 66 cannot extend into the groove any farther than would be possible if it were received in a selector rod slot.

When the clutch pedal is now depressed and released to accomplish the shifting from second to high speeds, the selector members are moved inwardly and outwardly. As the selector member S² moves inwardly its collar will engage the hub of the shifting fork 62 and thus neutralize second speed by moving the double clutch member 29 to its declutched position. As the selector member S¹ moves inwardly, the end of its rod 83 will engage the plunger 66 which is projecting into the groove 95 of the armature in which the rod slides and the beveled surface 98 thereon will enable the rod to slide underneath the plunger 66 and bring the plunger up onto the top of the rod and into the shallow groove 103 on said rod. When the selector member S¹ reaches its innermost position, the plunger will then drop into the slot 85 in rod 83 and thus produce a connection between the selector member and the shifting fork 62. When the clutch pedal is released and the selector members are caused to move outwardly by the action of the spring 129, the selector members S¹ will carry with it the shifting fork 62 and thus establish high speed, which condition is shown in Figures 2, 3 and 15 as an example of an established speed condition for the control mechanism.

Of course, second speed need not be pre-selected unless desired, as it can be selected after the gearing is neutralized by moving the clutch pedal to the position "B." Under such conditions the gearing will be neutralized by the clutch pedal and then upon a subsequent movement of the hand lever HL from the "S" position to the "H" position, the plunger 66 will be caused to be disengaged from the slot 91 and directly engaged with the slot 85 of the rod 83 since the selector members, by the movement of the clutch pedal, have previously been moved to their innermost positions.

From the foregoing description of the operations of establishing low, second and high speeds, either by pre-selection or by selection after the gearing is neutralized by fully depressing the clutch pedal, it is believed to be completely clear as to how the improved pre-selective control mechanism operates. In pre-selecting, the rotation of the selector members will always place a plunger in proper axial position so that when the selector members are moved inwardly to neutralize an established speed, the selector members will become positioned so that the desired plunger will drop into the proper slot in a rod of a selector member, depending upon the gear ratio which is pre-selected. The plunger to be connected with a rod will assume a position in alignment with the rod before the selectors are moved inwardly so that the rod can slide under the plunger and bring the slot into position to receive the plunger when there is a subsequent movement of the selectors inwardly by movement of the clutch pedal to position "B." It will be particularly noted that there is no restriction whatsoever on the operation of the gear selecting lever, regardless of whether the gearing is in neutral or a speed is established, or regardless of whether the clutch 15 is engaged or disengaged. This is very important, since if a speed should have been pre-selected before the clutch pedal was depressed and then the operator should have a change of mind and desire a speed other than the one pre-selected, this new speed may be selected after the clutch pedal has been depressed and it will be established whenever the clutch pedal is released. Also, it is believed to be apparent that if a speed is established and another speed pre-selected, this pre-selected speed need not be used if it should be desired to have still another speed, as such other speed can be pre-selected at any time. The transmission gearing will always be conditioned to whatever speed is indicated by the pointer for the hand lever whenever the clutch pedal is allowed to be released from the position "B."

Figure 22:
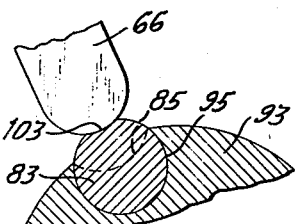
Figure 22 is a view similar to Figures 20 and 21 but showing the position of the plunger when engaging the shallow longitudinal groove on the outer diameter of a selector rod before said rod is moved inwardly to couple the plunger with the registering notch so that the plunger and associated shifting fork may be moved in unison to a selected gear-engaged position upon actuation of the selectors.
Figure 19:
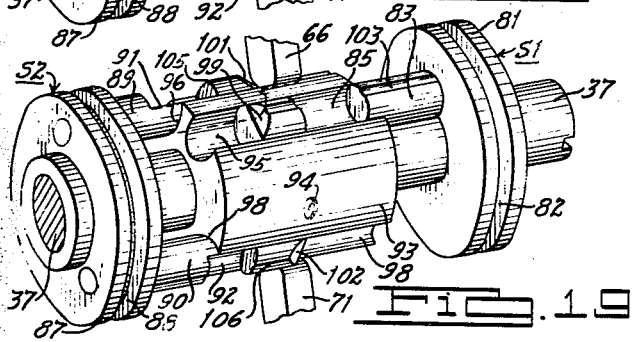
Figure 19 is another perspective view of the assembled selectors showing the selectors rotated to a position disengaging the shifter fork coupling plunger.

In connection with the improved preselective control mechanism, it is further noted that the rotation of the selector members is accomplished in an easy manner. The rounded ends of the plungers facilitate rotation of the armature member. The plungers also can easily be cammed up to ride on the exposed surfaces of any of the rods carried by the selector members. Whenever a plunger is in a slot in the rod, it can also be easily moved out of the slot onto the surface of the armature member. Even if a plunger is not in a slot in a rod, but is projecting into a groove of the armature member in which the rod slides, it can be cammed out of this groove as easily as it is cammed out of a slot. A plunger will never project into a groove of the armature member any greater distance than it projects into the slot in a rod. The effortless manner in which a plunger cooperates with a rod, its slot and the armature surface, is well illustrated by Figures 20, 21 and 22 which show, as an example, plunger 66 and rod 83 employed in establishing high speed. In Figure 20 the plunger 66 is shown as resting in the slot 85 of the rod 83, thus establishing a connection between the plunger and the rod so that the rod can move the plunger and the shifting fork which carries it. It will be noted that the plunger extends into the slot to a depth substantially half the diameter of the rod 83. Consequently, there is considerable surface of the plunger in engagement with the shoulder means established by the slot, thus producing a good "bite" on the flat side of the plunger so there will be no danger of any disengagement between the rod and the plunger during a shifting operation. Figure 21 shows the plunger riding on the surface of the armature 93. It has been cammed out of the slot 85 of the rod 83 by a rotation of the armature member in the direction of the arrow. It will be noted that the bottom of the slot 85 is curved so as to conform with the curvature of the rounded end of the plunger 66. Thus, whenever the armature is rotated with the plunger in the slot, the plunger will be moved in an easy stage out of the slot and up onto the armature surface. In Figure 22 the plunger is shown in a condition where it is riding on top of the rod 83 and in the shallow groove 103 thereof, which, as already mentioned, is employed to give an axial alignment seat for the end of the plunger and thus prevent the plunger from producing forces tending to rotate the armature from its selected position. When the selector members and the armature member are rotated from a position such as that shown in Figure 21 to the position shown in Figure 22 to bring the plunger into the groove 103 on the rod, it will be noted that the plunger will contact the exposed curved cylindrical surface of the rod as the armature member is rotated and will then be cammed upwardly and into the groove 103 by engagement between two curved surfaces.

*Description of control mechanism shown by Figures 1A to 16A*

In Figures 1A to 16A I have disclosed a transmission control mechanism of a modified construction and particularly adapted for controlling a change-speed transmission gearing which is provided with only two forward speeds and a reverse speed and a neutral condition for all of said speeds. In this modified control mechanism there are two selector members which are also provided for pre-selection, which selectors have a construction similar to the selector members $S^1$ and $S^2$ previously described in the control mechanism in Figures 1 to 22. In place of using slots in the axially extending rods of the selector members, the rods are arranged to have their ends abut the yieldable plunger to thus cause a shift to take place on the movement of the selectors inwardly instead of outwardly. In other words, the shoulder means on a rod for moving a yieldable plunger will be the end surface of a rod instead of an end surface of a slot in the rod. The control mechanism shown in Figures 1A to 16A also embodies other changes, one of which is the arrangement of the structure whereby the transmission can be neutralized by manual effort through employing the hand lever HL whenever it is moved to an indicated neutral position. In the particular control mechanism the hand lever is also employed to manually control the reverse speed, thus leaving the pre-selection features associated solely with the two forward speeds. In describing the control mechanism in detail, the same reference characters will be employed to indicate parts which are identical with previously described parts distinguished by the addition of the latter "a" to each, and slightly modified parts or new parts will be indicated by the new reference characters.

The selecting mechanism is arranged to be enclosed within a casing 11a which will be the cover plate for the transmission mechanism housing 12a, said cover plate being bolted to the housing by bolts 13a. As shown in Figure 2A, the two forward speed and reverse speed transmission gearing comprises a driving gear 14a at the forward end of the housing, said gear being driven from the engine through the friction clutch 15a. This friction clutch is the same as shown in Figure 1 of the drawing and the various parts thereof are indicated by the same reference characters, with the clutch 15a being controlled by the pedal P which has a position "A" wherein the clutch is disengaged, and another position "B" to which it can be moved to perform gear changing while the clutch remains engaged. The driving gear shaft 19a connected to the clutch 15a drives the gear 14a in the gearing housing.

Within the housing and parallel to the axis of the driving gear 14a is a countershaft 20a which has a gear 21a in constant mesh with the gear 14a. The countershaft also carries a low speed gear 22a and a reverse gear 23a with which is meshed a reversed idler gear 28a. The gear 22a is in constant mesh with the companion low speed gear 26a rotatably mounted upon the driven shaft 25a of the gearing. Rearward of the gear 26a and splined on the driven shaft is a slidable gear 200 which is arranged to move from its neutral position, shown in Figure 2A, rearwardly to mesh with the idler gear 28a and establish a reverse gear drive. The driven shaft 25a is arranged to be connected to the gear 14a to establish a high speed or direct drive by the double clutch member 29a. This double clutch member is also capable, when moved from its neutral position rearwardly, to connect the low speed gear 26a to the driven shaft. The various clutch teeth for making the connections by the slidable movement of the double clutch member 29a are indicated by the numbers 30a, 31a, 32a and 33a. The double clutch member is arranged to be controlled by a shifting fork 62a and the slidable gear 200 is arranged to be controlled by a shifting fork 201.

Within the cover 11a for the gearing housing is the selector shaft 202 on the forward end of which is the sector gear 47a arranged to be rotated by the hand lever HL which is mounted on the steering column 41a of the vehicle, as shown in Figure 1A. The hand lever HL operates a steering column shaft 203 in the conventional manner, and on the lower end of this shaft are two arms 204 and 205 with which the shaft is adapted to be selectively connected by cross pin 206 engaging either slot 207 in the hub of arm 204 or slot 208 in the hub of arm 205. The lower end of the shaft 203 is journaled in a bracket 57a. The arm 204, is connected to rotate the selector shaft 202 and the connecting structure is identical with that already described in connection with the control mechanism shown in Figures 1 to 22. The rack 42a, which cooperates with the sector gear 47a on the end of the selector shaft 202, is provided with three recesses indicated, as shown in Figure 5A, by the letters "H," "L" and "N" with which cooperates a ball detent 209, thus providing locating means for the three positions to which the rack can be moved by the hand lever HL in selecting either of the two lower speeds or neutral.

The indicating plate 210, which is associated with the hand lever HL, is arranged on its upper flanged edge to have an L-shaped slot 211 in which is movable a pointer 212 secured to and movable with the hand lever. The long leg of the L slot is marked with the letters "L" and "H," with the "H" position being at the far end of the slot. The end of the short leg of the L slot is marked with the letter "R" to indicate reverse speed ratio and the portion of the slot connecting the long and short legs is marked with the letter "N" to indicate neutral.

Since in the control mechanism shown, the reverse speed is manually controlled by the hand lever, provision is made to connect the hand lever with the reverse speed shifting fork 201. As shown in Figure 1A, the lower end of the shaft 203 on the steering column carries an arm 205 adjacent arm 204 and this arm 205 is connected by means of a rod 213 to an arm 214 pivotally mounted on a short shaft 215 carried by the rear portion of the cover plate 11a. The inner end of this shaft within the cover plate carries an upstanding arm 216 and this arm is arranged to extend into a slot 217 in the hub 218 of the shifting fork 201, which hub is slidable on a rod 219 positioned in the top portion of the cover plate 11a and extending parallel with the selector shaft 202. The hub of the shifting fork also carries a detent 220 (see Figures 2A and 7A) which cooperates with recesses 221 and 222 in the rod 219 to thus provide locating means for the two positions of the shifting fork, such two positions being the neutral position and the engaged position for the gear 200.

Both arms 204 and 205, which are mounted on the lower end of the steering column shifting control shaft 203, are arranged to be selectively connected to said shaft by a reciprocal movement of the shaft. This is accomplished by means of the cross pin 206 in the shaft and the slot 207 in the hub of the arm 204 and a slot 208 in the hub of the arm 205. The two slots in the hubs of these arms will be opposite each other whenever the hand lever is in the "N" position. If the hand lever should be aligned with the long leg of the indicating plate slot, then the cross pin 206 will be in the slot 207 and the arm 204 can be actuated by the hand lever whenever it is rotated so that the pointer moves in the long leg of the slot 211. If the hand lever HL should be moved upwardly when the pointer is at the "N" position, then the shaft 203 will also be moved upwardly and this will result in the pin 206 being moved into the slot 208 of the hub of the arm 205 and thereby connect said arm to the shaft 203 so that when the hand lever HL is rotated downwardly, as viewed in Figure 1A, the arm 205 will be so rotated that the shifting fork 201 will be moved rearwardly and thus establish reverse speed. Return of the hand lever to the "N" position disengages gear 200. With this arrangement it will be seen that the engaging and disengaging of the reverse speed is accomplished solely by manual effort.

The rotatable selector shaft 202 carries the armature member 223 and arranged to cooperate with this armature member are the two selector members $S^3$ and $S^4$. The selector member $S^3$ comprises a collar 224 from which axially extends two cylindrical rods 225 and 226. Similarly, the selector member $S^4$ comprises a collar 227 from which extends two cylindrical rods 228 and 229. These rods are arranged to be positioned in grooves 230, 231, 232 and 233 in the armature member 223, as shown in Figures 11a, 12a and 13a. The rods are shorter than the previously described rods of the selector members of the control mechanism shown in Figures 1 to 22 and they are not provided with any slots. The grooves in the armature member in which the rods extend have a curvature length which is slightly greater than a semi-cylinder.

The gear shifting fork 62a which controls the double clutch member 29a is provided with a hub 64a and this hub carries a plunger 66a backed by a spring 67a. The hub also carries a spring-biased detent means 234 which cooperates with three recesses 235, 236 and 237 in the rod 219. The spring-biased plunger 66a cooperates with the armature member 223 and the two rods 225 and 228 carried by the two selector members $S^3$ and $S^4$ in order to accomplish selecting and shifting operations. The rods 226 and 229, which are part of the two selector members, have no function with respect to shifting or selecting as they are merely employed for a balanced arrangement and also to provide ample bearing alignment between the selector members and the armature member 223. The rod 226 of selector member S⁴ is employed to cooperate with the plunger 66a to make the shift into high speed, and the rod 225 of the selector member S³ is employed to make the shift into low speed. When the rods act upon the plunger 66a, they always perform a change between one speed and another and this shift is to be accomplished only when the selector members are moved inwardly toward each other. The arrangement is such that no shifting in any manner is accomplished during the outward movement of the selector members.

The selector members are arranged to be moved inwardly and outwardly in an axial direction on the selector shaft 202 by the operation of the clutch pedal and through functioning of structure which is substantially the same as that described in connection with the control mechanism shown in Figures 1 to 22. Briefly described, this structure comprises the two companion racks 107a and 108a carried by the casing with the teeth of both of said racks meshing with the gear 109a. Rack 107a is arranged to be connected with the collar 224 of the selector member S³ and the rack 108a is arranged to be connected with the collar 227 of the selector member S⁴. Gear 109a is arranged to be rotated by gear 116a carried on the shaft 113a. Gear 116a is rotated by sector gear 117a carried by shaft 118a which extends to the outside of the cover plate 11a. The outer end of shaft 118a carries the double arm lever 239 with one arm 240 connected to the clutch pedal by the rod 121a, the other arm 241 being acted upon by the spring 129a, all shown in Figure 1A. The clutch pedal is connected with arm 240 through the lost motion connection shown and the stop pin 124a is provided to cooperate with the slot 125a to thus limit the rotation of the arm 239.

When the engine clutch 15a is engaged by a full release of the clutch pedal P, the selector members S³ and S⁴ will be in their innermost position as shown in Figure 15A. When the clutch pedal is depressed to the position "B" which is beyond the clutch disengaged position "A" of the clutch pedal, the selector members will be in their spread apart position as indicated in Figure 3A. Since the selector members will be in their spread apart position when the clutch pedal is in the position "B," then no speed shifting is accomplished during the movement of the clutch pedal from the position "A" to the position "B." The spring 129a, however, will be compressed. When the clutch pedal is released and allowed to move from the position "B" to the position "A," the spring 129a will expand and its action on the double arm lever 239 will result in the selector members being moved inwardly. If a speed has been pre-selected other than the one which might be established, a shift will be accomplished.

The control mechanism also is provided with an interlocking mechanism whereby it will be impossible to rotate the selector members while reverse speed is being manually established, or whereby it will be impossible to establish reverse speed whenever the selector members are being rotated to make a selection or pre-selection. This interlocking mechanism is best shown in Figures 7A, 15A and 16A. The hub 218 of the gear shifting fork 201 is provided with a downwardly extending portion 240 which is arranged to slidably cooperate with the selector shaft 202. This extension carries in a bore thereof a slidable interlocking pin 241. One end of the pin is arranged to engage in a longitudinal groove 242 of the selector shaft 202 whenever said selector shaft is placed in neutral position, as determined by moving the hand lever HL to the end of the L-shaped slot marked "N." The other end of this interlocking pin is arranged to cooperate with a recess 243 in the rod 219 and then only when the shifting fork 201 for the low speed is in a position where the gear 200 is out of mesh with the idler gear 28a, all as shown in Figure 2A. The interlocking pin 241 is of such length that when moved out of recess 243 it will be pushed into groove 242 and vice versa.

With this interlocking structure it will be seen that whenever the shifting fork 201 is caused to be shifted manually by the hand lever HL to establish reverse speed, the hub of the shifting fork will move on the rod 219 and consequently the interlocking pin 241 will be moved out of the recess 243 and pushed into the groove 242 where it will slide. This will result in the selector shaft 202 being prevented from rotation. If the hand lever HL should be moved into either the high or low position, that is, with the pointer going into the long leg of the L slot on the indicating plate, then there will be a rotation of the selector shaft 202 while the gear shifting fork 201 is in its neutral position. This rotation of the selector shaft 202 will result in the interlocking pin 241 being cammed out of the groove 242 in the selector shaft 202 as it is rotated from its neutral position and, consequently, the pin will be forced into the recess 243 in rod 219, thereby locking the shifting fork 201 to the rod and preventing it from being moved.

As already mentioned, it is intended in the control mechanism of Figures 1A to 16A that neutralization of the transmission gearing can be accomplished by hand effort and not by operation of the clutch pedal. This is accomplished by the following structure. As shown in Figures 3A, 8A and 15A, the hub 64a of the shifting fork 62a is provided with a pin 244 on the side adjacent the inside of the cover plate 11a and carried on this pin is a roller 245. Pivotally mounted on the cover plate above the roller 245 are two neutralizing companion levers 246 and 247. Both of these levers are L-shaped and the lever 246 is pivoted to the casing by a pin 248 and the lever 247 is pivoted to the casing by a pin 249. The longer leg of each lever is arranged to extend downwardly on each side of the roller 245 and the shorter legs of the lever extend toward each other and are provided with teeth for intermeshing relation. Thus, by rotating one lever, both levers can be moved simultaneously, either toward each other or to spread apart positions. On the outer end of the pivot pin 249 of the companion lever 247 there is provided an arm 250. This arm, as best shown in Figure 14A, is arranged to cooperate with an arm 251 which is integral with the bellcrank lever 51a having arms 50a and 53a mounted on the pivot 52a, and all of which forms a part of the connection between the hand lever HL and the selector control shaft for rotating the selector member. The arm 251 and the arm 250 have such relation with each other that whenever the hand lever HL is moved to neutral, as indicated by the pointer on the indicating plate, the arm 251 will so act on the arm 250 as to cause the two neutralizing companion levers to be moved towards each other to a position as indicated in Figure 15A. Whenever these companion levers are so moved they will act upon the roller 245 carried by the gear shifting fork 62a. Thus, if the gear shifting fork 62a should be in either of its operative positions corresponding to establishment of either high or low speed, it will bring the shifting fork back to its neutral position so the double clutch member 29a will be unclutched from both the driving shaft 14a and the low speed gear 26a. Such a condition is shown in Figure 15A. However, whenever the hand lever HL is moved to either the indicated low or high positions, to select these speeds the arm 251 will move away from the arm 250 to the position shown in full lines in Figure 1A or the dashed lines in the same figure. This will enable free movement of the companion levers and, consequently, the shifting fork 62a can be shifted. Upon the shifting of this fork in either direction and movement of the roller 245 therewith will result in the free movement of companion levers apart to the positions shown in Figure 3A where they will remain until the hand lever HL is again moved to the indicated neutral position. When the hand lever is so moved, then the transmission will again be manually neutralized because the companion levers will be brought together, thus causing the shifting fork 62a to be brought back to its neutral position and the selectors S³ and S⁴ simultaneously rotated to a position wherein no speed selection is effective.

*Operation of control mechanism shown by Figures 1A to 16A*

In connection with the operation of the control mechanism shown in Figures 1A to 16A, let it first be assumed that the hand lever HL is in its neutral position wherein the pointer 212 is at the "N" end of the L-shaped slot. With such conditions, the transmission gearing will be in neutral condition, regardless of any condition of the power-transmitting clutch 15a. With the hand lever in the "N" position, the selectors S³ and S⁴ will be rotated to a position wherein the single plunger 66a will be riding on a smooth surface of the armature member 223 between the rods 225 and 229 of the selector members. The neutral condition of the transmission gearing will have been obtained by the manual moving of the hand lever to the said neutral position and under such conditions the companion levers 246 and 247 will be moved to their innermost positions, as shown in Figure 15A. If, when the gearing is in neutral position, the clutch pedal is released and the clutch engaged, the selector members S³ and S⁴ will be in their innermost positions as shown in Figure 15A. If the clutch pedal, however, should be depressed to the position "B" beyond the clutch disengaged position "A," the selector members will be in spread apart position as is shown in Figure 3A.

With the transmission gearing in neutral condition and it should be desired to place the gearing in low speed, the hand lever HL will be moved so the pointer is opposite the letter "L" on the indicating plate. Such movement of the hand lever will result in the arm 204 being rotated and through its connection with the selector shaft 202 the selector members will be rotated so that the plunger 66a will drop into the groove 230 in the armature member 223. Let it also be assumed that when the hand lever HL is moved to the indicated "L" position, the clutch pedal P will be depressed to the position "B." Before selecting low speed with the vehicle stopped, the clutch pedal "P" should preferably be depressed to this position "B," although it need not be. When in such position the selector members will be in their spread apart positions as shown in Figures 3A and 11A.

With low speed selected, then to establish said speed it will only be necessary to release the clutch pedal P. When this is done the compressed spring 129a will expand and such will cause the selector members to be moved inwardly to the position shown in Figure 15A. As the selector member S³ moves inwardly, the end of the rod 225 thereof will engage the plunger 66a which has been placed in the groove 230, thereby picking up this plunger and moving it rearwardly and thereby causing the shifting fork 201 to also be moved rearwardly and establish a connection between the low speed gear 26a and the driven shaft 25a by way of the double clutch member 29a of the transmission. The establishment of the low speed will also result in the neutralizing companion levers 246 and 247 being spread apart. Low speed will now continue to remain established as long as the hand lever HL remains in the position indicated by the "L" position of the pointer and notwithstanding any declutching of the clutch 15a. It will be noted that even if the clutch pedal P is depressed to the position "B" and then released, it will still not cause any change in the condition of the shifting fork 62a. It will, however, result in the selector members being moved inwardly towards each other and then outwardly again, but the position of the plunger 66a will not be changed as the end of the rod 225 moves away from it and then returns.

With the low speed established and it should be desired to pre-select high speed, the hand lever is first moved to the position where "H" is indicated by the pointer. After this movement, high speed can be established at any time by fully depressing and releasing the clutch pedal. When the hand lever is placed in the "H" position, the selector shaft 202 is rotated so that the selector rod 228 is moved underneath the plunger 66a and to a position where the plunger 66a of the selector member S⁴ is riding in a longitudinal groove 238 on top of said rod. In other words, the armature member is so rotated that it cammed the plunger 66a out of the groove 230 and then caused it to be cammed up onto the rod 228. With this rotative position of the selector members it will then be apparent that upon a depressing of the clutch pedal to the position "B" and then releasing it the plunger 66a will be moved to the position shown in Figure 11A. It will be noted that when the clutch pedal P is depressed, the selector members will be moved apart and consequently the rod 228 will be moved out from underneath the plunger 66a, thereby allowing the plunger to drop into the groove 231 just ahead of the inner end of the rod 228. When the selector members are subsequently moved inwardly toward each other by release of the clutch pedal and expansion of spring 129a, the end of the rod 228 will engage the plunger 66a, thereby moving it to the position shown in Figure 11A. As a result of this plunger movement, the shifting fork 62a and the double clutch member 29a will be so shifted that gear 26a will be declutched from the driven shaft 25a and said driven shaft will be directly clutched to the gear 14a of the transmission which is capable of being driven directly from the engine of the vehicle through the friction clutch 15a. High speed will be maintained as long as the hand lever remains in the "H" position, regardless of any declutching and reclutching by pedal movement and movement of the selector members outwardly and inwardly.

If the clutch pedal P should be depressed to the position "B" prior to the movement of the hand lever from the "L" position to the "H" position, then of course when the selector members are rotated the plunger 66a will not ride up onto the rod 228, but will drop into the groove 231 since under such conditions the selector members $S^3$ and $S^4$ are in spread apart positions.

If, while high speed is established, it should be desired to pre-select low at any time, the hand lever HL need only be placed so that the pointer is at the "L" position. This will so rotate the selecting members and the armature member 223 that the plunger 66a will be moved out of the groove 231 of the armature member and up onto the rod 225 of the selector member $S^3$. When the clutch pedal is subsequently depressed and released, the shift will be made to low speed, due to the fact that the rod 225 will be withdrawn from beneath the plunger 66a during its outward movement and its end will then engage the plunger and move it rearwardly during the inward movement to make the shift from the high speed to the low speed.

During all the time that the hand lever HL is being employed to pre-select low or high, the interlocking mechanism will function to prevent any movement of the reverse speed gear since, under such conditions, the longitudinal groove 242 in the selector shaft will be in a position wherein the locking pin cannot be received therein, as can be readily seen in Figure 7A.

Whenever it is desired to neutralize the gearing, the hand lever HL will be moved to the "N" position and this will result in the neutralizing companion levers moving together to the position shown in Figure 15A to thereby bring about a manual neutralization.

It is already believed to be apparent how reverse speed is obtained by manual effort. Briefly described, however, this speed is obtained by moving the HL lever to the "N" position, raising up on said hand lever to thereby disconnect the shaft 223 from the arm 204 and connect it with the arm 208, then pulling the hand lever downwardly so that the pointer moves to the position "R." This downward movement of the hand lever will, through the rotation of the arm 205 and its connection with the shifting fork 201, shift the reverse speed gear 200 into mesh with the idler gear 28a and establish the reverse speed. When reverse speed is established, the interlocking mechanism will prevent any rotation of the selector shaft, due to the fact that one end of the interlocking pin will then be moved into the groove 242 of the selector shaft 202 and lock it from rotating as shown in Figure 16A. Reverse speed is neutralized by returning the hand lever HL to the "N" position.

It will be noted that the rotatable selector members have a cooperation with the plunger 66a in the selecting mechanism, shown in Figures 1A to 16A, which is the same as the cooperation of the selector members described in the control mechanism shown in Figures 1 to 22. Whenever either of the rods 225 and 228 engage the plunger 66a to perform a shift, the plunger will be engaged by such an end surface of the rod as is equal to a depth of substantially one-half of the diameter of the rod, thus a good "bite" on the plunger is obtained by the rod so that positive shifting will always take place. The selector members $S^3$ and $S^4$ are easily rotated and the movement of the plunger out of the grooves of the armature member and onto the rod surface is accomplished in an easy two-stage camming operation, due to the rounded end form of the plunger cooperating with the cylindrical surfaces of the armature member and selector rods, as already mentioned in connection with the selector members and the armature member of the control mechanism shown in Figures 1 to 22. In order that the plunger can have a seat on the rods 225 and 228 whenever such plunger rides up onto either of the rods, such rods are provided with longitudinal alignment grooves 238, as shown.

*Selector members shown in Figures 1B to 6B*

In Figures 1B to 6B I have shown another modified selector mechanism which can be substituted for the selector members shown in the control mechanism of Figures 1 to 22. In this embodiment also, corresponding parts are designated by like reference characters to those previously used, distinguished, however, by the addition of the letter "b" to each. This modified structure eliminates the necessity for an armature member as both selector members are so provided with sufficient number of rods that when assembled in overlapping relation a complete circle of selector rods is formed. As shown in the figures, the two selector members $S^5$ and $S^6$ are arranged to be slidably and rotatably mounted on the selector shaft 302. The selector member $S^5$ comprises a collar 303 provided with a hub 304. This hub is slotted to receive a pin 305 to thus permit the collar to slide on the shaft 302, yet be rotatable thereby. Axially extending from the collar are rods 306 and 307. The selector member $S^6$ also comprises a collar 308 having a hub 309 provided with slots for receiving a pin 310, by means of which the collar is slidably mounted on the selector shaft 302, yet capable of rotation therewith. Extending from the collar are two rods 311 and 312.

The rods 306, 307, 311 and 312 on the selector members $S^5$ and $S^6$ correspond to the rods 83, 84, 89 and 90 on the selector members $S^1$ and $S^2$, previously described in the control mechanism shown in Figures 1 to 22. The rod 306 has a slot 313 to receive the plunger 66b, the rod 307 has a slot 314 to receive the plunger 71b, the rod 311 has a slot 315 to receive the plunger 66b and the rod 312 has a slot 316 to receive the plunger 71b. When the plunger 66b is in the slot in the rod 306, high speed can be established when the selector members are moved outwardly. When the plunger 66b is in the slot of the rod 311, second speed can be established when the selector members are moved outwardly. When the slot in the rod 307 receives the plunger 71b, the low speed can be established when the selector members are moved outwardly. When the slot of the rod 312 receives the plunger 71b, reverse speed can be established when the selector members are moved outwardly. The rotative positioning of the selector members so that the plunger can be received in these slots for establishing the various speeds is accomplished by rotation of the selector shaft 302 in the same manner as already described in connection with the control mechanism shown in Figures 1 to 22. The shifting of the selector members away from each other and towards each other to establish different speeds and to accomplish neutralization will be done in the same manner as already described in connection with the control mechanism shown in Figures 1 to 22.

When the selector members S⁵ and S⁶ are placed together, the four selecting and shifting rods will be arranged to lie in a circle, with the rods 306 and 311 in juxtaposition and the rods 307 and 312 in spaced relation. This position of the rods will result in a space between certain of the rods which would not accommodate ready rotation of the selector members beneath the plungers to accomplish pre-selection. To provide means for the plungers to ride upon when the selectors are rotated, the selector members are provided with additional rods, thus selector member S⁵ has additional rods 317, 318 and 319. Similarly, the selector member S⁶ has additional rods 320, 321 and 322. There will thus be on each selector member a total of five rods. With these ten rods arranged to be in interfitting relation, a complete circle of rods is provided, as will be readily apparent from Figures 5B and 6B. Consequently, a plunger, when not received in any slot of the slotted rods, will always have a rod to ride upon, and when the selector members are rotated from one position to another, surface means will be provided by the extra rods on which the plunger can ride. As the various rods of each selector member are interfitting, a solid structure will be provided and each rod will lie against rods on opposite sides thereof. It will also be noted that in the selector structure the rods carried by one collar of a selector member will have their free ends extending through and supported in holes in the collar of the other selector member for all axial positions of the selector members, regardless as to whether the selector members are moved to their inward positions as shown in Figure 4B, or to their spaced apart positions as shown in Figures 1B and 2B. All rods will also be provided with longitudinally extending plunger aligning grooves in their outer surfaces, as is clearly disclosed in the various figures. These grooves will thus provide a seat means upon which the plungers can rest, without establishing any forces tending to rotate the selector members. This is well illustrated in Figure 5B wherein the plunger 66b is shown received in the slot 313 of the rod 306 which is the slot employed to establish high speed. When the plunger 66b is in the slot, the plunger 71b will be riding on top of the diametrically opposed rod 321 of the selector member S⁶ and it will be seated in the shallow longitudinal groove of said rod. Thus, neither plunger 66b nor 71b will be producing any forces tending to rotate the selector members from their desired positions.

The rounded ends of the plungers 66b and 71b will cooperate with the curved bottoms in all of the various slots, and thus there will be an easy lifting of the plungers from the slots on rotation of the selector members.

When the selector members are being rotated beneath the plungers, the plungers will ride down into the space between adjacent rods, but due to the rounded ends of the plungers and the juxtaposed position of the cylindrical surfaces of the rods, the rotation of the selector members will not be difficult, as is readily apparent from inspection of Figure 6B which shows the plungers in position between rods as the selector members are being rotated.

The construction of the selector members S⁵ and S⁶, shown in Figures 1B to 6B, is shown as specially designed for pre-selecting and shifting four speeds, namely, first, second, high and reverse. It is believed to be apparent, however, that the construction is particularly well adapted for use in pre-selecting and shifting more than four speeds, due to the large number of rods carried by each selector member. If it should be desired to pre-select and shift additional speeds then any desired number of rods among the group of additional rods 317 to 322 will be provided with slots. The space taken by the whole ten rods of the two selector members is small and thus there will be room to place additional shifting forks about the circumference of the circle established by the arrangement of the rods.

There is disclosed herein, by drawings and description, three forms of inter-related selecting structure whereby it is possible to pre-select different speeds of a variable speed transmission without any restriction upon the pre-selection. There has also been disclosed various control mechanisms in which the selecting mechanisms can be embodied. However, it is to be understood that all of the structure illustrated is by way of example only, as the selecting structure can take other forms and can be embodied in various types of control mechanism. Although a manually operable hand lever is shown as the means for rotating the various selector members, it is possible to employ other means to perform the rotation of the selector members. Furthermore, although the axial shifting of the selector members to and from each other is shown as being accomplished by the manually operated clutch pedal and a power means shown as a spring means, other means such as a fluid motor can be employed to perform these functions of moving the selector members inwardly and outwardly in opposite directions. Additionally, the neutralizing and establishment of a selected speed can be made either by an inward movement of the selector members or by an outward movement of the selector members, whichever may be most desirable. The axial movement of the selector members from one position to another position can be used for neutralizing, and the opposite movement of the selector members can be used for shifting to establish a selected speed, all as illustrated by the control mechanism shown in Figures 1 to 22. It is also possible, as shown by the control mechanism in Figures 1A to 16A, to accomplish a neutralization and an establishment of a pre-selected speed by the movement of the selecting members in one predetermined direction only, that is, only inwardly or outwardly. Therefore, being aware of possible modifications in connection with the particular structure illustrated by the drawings and described in the foregoing specification, without departing from the fundamental principles of my invention, it is intended that the scope of said invention is not to be limited in any manner except as set forth in the appended claims.

I claim as my invention:

1. In control mechanism for a change gear transmission having shiftable elements for controlling the gear ratios thereof, selector members comprising a plurality of axially extending cylindrical rods positioned in circular arrangement in axial overlapping relation and mounted for simultaneous rotation and relative axial sliding movement, means for selectively connecting the shiftable elements to the selector rods by rotation of the selector members, means for rotating the selector members including a rotatable hub extending axially of said rods and in peripheral engagement therewith for indexing rotation of said selector members, and means for simultaneously sliding the selector members in opposite directions.

2. In change gear transmission control mechanism, shifting elements, a spring actuated coupling plunger carried thereby, rotatable selectors comprising a plurality of axially extending cylindrical rods positioned in circular arrangement in axial overlapping relation and each rod provided with an abutting shoulder, means for relatively shifting the selectors axially to positions where said plungers can be selectively engaged by said cooperating shoulders, and means for simultaneously rotating said selectors to condition a rod for engaging the plunger by its shoulder including a hub extending axially of said rods and having arcuately spaced recesses for receiving certain of said rods therein to index said rods relative to the remaining rods.

3. In a control mechanism for a variable gear ratio transmission, a shiftable member for changing gear ratios thereof, a yieldable element carried by the shiftable member, selector members having a common axis and mounted for simultaneous rotative movement about said axis and for relative axial sliding movement, each of said members comprising an axially extending cylindrical rod with the axis of the rods radially spaced circumferentially about the rotatable axis of the selector members, each rod being provided with shoulder means for selectively engaging the yieldable element while in predetermined axial positions, said shoulder means on each rod and the yieldable element being so arranged that the element when engaged by the shoulder will extend into the rod substantially half the diameter of the rod, means for rotating the selector members, and means for moving the selector members axially in opposite directions for effecting the shifting of said shiftable member.

4. In control mechanism for a variable gear ratio transmission, a shiftable member for changing gear ratios thereof, selector members having a common axis and mounted for simultaneous rotative movement about said axis and for relative axial sliding movement, means for simultaneously rotating the selector members, means for sliding the members simultaneously in different directions, and means for selectively connecting the selector members to the shiftable member of the transmission by a rotation of the selector members, said last named means comprising axially extending circumferentially spaced cylindrical rods carried by the selector members, a yieldable plunger carried by the shiftable member of the transmission and arranged to have a movement radial with respect to the axis of the selector members, and a notch in each rod having end shoulders lying at right angles to the rod axis for engaging a side of the plunger when the selectors are in predetermined rotative and axial positions, and when the plunger is engaged the rod can move the shiftable member of the transmission by axial movement of the selectors from said predetermined positions, the notch in each rod being of such depth that the plunger can extend into the rod substantially half the diameter of the rod to provide an enlarged rod shoulder thrust area for engaging the plunger.

5. In a control mechanism for a variable gear ratio transmission, a shiftable member for changing gear ratios thereof, a yieldable plunger carried by the member to be shifted, selector members having a common axis and mounted for simultaneous rotative movement about said axis and for relative axial sliding movement, each of said members comprising an axially extending cylindrical rod with the rods arranged to be in a circle about the rotatable axis of the selectors but in different radial planes, each rod being provided with a slot for forming a shoulder, means for selectively engaging the yieldable plunger by rotative movement of the selector members when in predetermined axial positions, the slot in each rod being of such depth that when the plunger is received therein the shoulder means engageable with the plunger will be substantially half the diameter of the rod, means for rotating the selectors about said common axis, and means for axially shifting the selector members relative to one another to effect the selected gear ratio, the relatively deep slots providing a substantial shoulder area for engagement with said plunger to effect corresponding movement thereof with said rods when axially moved with said plunger extending into one of said slots.

6. In control mechanism for a variable gear ratio transmission, a shiftable member for changing gear ratios thereof, selector members having a common axis and mounted for simultaneous rotative movement about the axis and for relative axial sliding movement, means for simultaneously rotating the selector members, means for sliding the members simultaneously in opposite directions, and means for selectively connecting the selector members to the shiftable member of the transmission by a rotation of the selector members when in a predetermined axial position, said last named means comprising axially extending cylindrical rods carried by the selector members and arranged to lie in a common circle about the rotatable axis of the selector members but in angular spaced relation, a yieldable plunger carried by the shiftable member of the transmission and arranged to have a movement radial with respect to the axis of the selector members, shoulder means on the rods for engaging a side of the plunger when the selector members are in predetermined positions and when the plunger is engaged the rod can move the shiftable member of the transmission by axial movement of the selectors from said predetermined positions, said shoulder means on the rods being so formed as to present a surface having a depth substantially half the diameter of the rods, and hub means between the angularly spaced rods having recesses receiving the rods and arcuate portions between said recesses providing a surface on which the plunger can ride when disengaged from the selector members.

7. In control mechanism for a variable gear ratio transmission, a shiftable member for changing gear ratios thereof, selector members having a common axis, means for rotating the selector members including a rotatable hub coaxial with said selector members slidably receiving said selectable members, means for simultaneously sliding the selector members axially relative to said hub in opposite directions, said selector members comprising axially extending cylindrical rods arranged with their axes in a circle about the common axis and being provided with slots capable of circular alignment when the selectors are in predetermined axial positions and each being of a depth substantially half the diameter of a rod, and means carried by the shiftable member for selectively engaging the slots by a rotation of the selector members so that upon axial movement of the selector members the shiftable member will be shifted in unison therewith to effect the selected gear ratio.

8. In a control mechanism for a variable gear ratio transmission, a shiftable member for changing gear ratios thereof, a rotatable cylindrical member provided with two axially extending grooves in its surface in circumferentially spaced relation, rods positioned in said grooves for axial sliding movement relatively to the grooves, means for simultaneously rotating the cylindrical member and rods, means for sliding the rods in opposite directions in the grooves, and means for selectively connecting the rods to the shiftable member by a rotation of the cylindrical member for effecting shifting of the shiftable member in opposite direction by axial movement of the rods.

9. In a control mechanism for a variable gear ratio transmission, a shiftable member for changing gear ratios thereof, a rotatable cylindrical member provided with two axially extending grooves in its surface in circumferentially spaced relation, rods positioned in said grooves for axial sliding movement relatively to the grooves, means for simultaneously rotating the cylindrical member and rods, means for sliding the rods in opposite directions in the grooves, and means for selectively connecting the rods to the shiftable member by a rotation of the cylindrical member for effecting shifting of the shiftable member in opposite directions by axial movement of the rods, said last named means comprising a spring pressed plunger carried by the shiftable member and a shoulder means on each rod for engaging the plunger, said plunger being capable of riding on the surface of the cylindrical member except when it is rotated to selectively connect the plunger with the rods.

10. In a control mechanism for a variable gear ratio transmission, a shiftable member for changing gear ratios thereof, a rotatable cylindrical member provided with two circumferentially spaced axially extending grooves in its surface, rods positioned in said grooves and having a cylindrical surface projecting above the cylindrical surface of the cylindrical member, shoulder means on said rods, means for simultaneously moving said rods in opposite directions relatively to the cylindrical member, a yieldable plunger carried by the shiftable member capable of being engaged by the cylindrical surface of a rod if the rod is in an axial position to engage the plunger whenever the cylindrical member is rotated, or to be received in a groove so as to be engageable by said shoulder means on one of said rods and thereby establish a connection between one of said rods and shiftable member so that movement of the rod in an axial direction will shift the shiftable member.

11. In a control mechanism for a variable gear ratio transmission, a shiftable member for changing gear ratios thereof, a rotatable cylindrical member provided with two axially extending grooves in its surface, means for rotating said cylindrical member, rods slidable in the grooves, said rods being provided with slots having a depth extending below the surface of the cylindrical member, means for moving the rods so that the slots are in circular alignment or are spaced apart axially of the cylindrical member, and a yieldable plunger carried by the shiftable member for engaging in a slot when opposite a rod containing the slot or for riding on the surface of the cylindrical member when the said member is rotated, said plunger when engaging a slot establishing a connection between the rod and the shiftable member so that upon axial movement of the rod the shiftable member will be shifted.

12. In a control mechanism for variable gear ratio transmission, a shiftable member for changing gear ratios thereof, a rotatable cylindrical member having two grooves in its surface, means for rotating the cylindrical member, rods slidable in the grooves, means for moving the rods axially in opposite directions in their grooves, a yieldable plunger, and means for selectively connecting the plunger to the rods by a rotative movement of the cylindrical member to positions where the plunger is in a plane of the axis of a rod and thus capable of being received in a groove, said plunger during rotative movement of the cylindrical member to place the rods in positions of connection with the plunger riding on the cylindrical surface thereof.

13. In a control mechanism for a variable gear ratio transmission, a shiftable member for changing gear ratios thereof, a rotatable cylindrical member having two grooves in its surface, means for rotating the cylindrical member, rods slidable in the grooves, means for moving the rods axially in opposite directions in their grooves, a yieldable plunger, and means for selectively connecting the plunger to the rods by a rotative movement of the cylindrical member to positions where the plunger is in a plane of the axis of a rod and thus capable of being received in a groove, said rods being so formed and associated with the grooves that a cylindrical surface of a rod will project above the cylindrical surface of the cylindrical member and the grooves therein being such depth as to extend below the cylindrical surface of the cylindrical member.

14. In a control mechanism for a variable gear ratio transmission, a shiftable member for changing gear ratios thereof, a rotatable cylindrical member having two axial grooves circumferentially spaced apart in its surface, rods in said grooves, means for moving the rods simultaneously in opposite directions both inwardly and outwardly in said grooves, said rods in their inner positions having their inner ends overlapped and when in their outer positions having their inner ends spaced apart axially of the cylindrical member, a yieldable plunger carried by the shiftable member of the transmission, means for simultaneously rotating the cylindrical member and rods so that the plunger can be radially aligned with either groove for reception in the groove and engageable by the inner end of the rod of said groove when the rods are caused to move from their outer positions to their inner positions.

15. In a control mechanism for a variable gear ratio transmission, a shiftable member movable from one position to another position through a neutral position to thereby change gear ratios, means for shifting said member back and forth to change from one gear ratio to another and comprising two rods arranged so that their axes lie in a circle and capable of axial movement, means for rotating said rods about the center of said circle as an axis including a rotatable hub slidably receiving said rod for rotation therewith, means for selectively connecting the shiftable member to the rods by a rotation of the rods about the axis of the circle, means for simultaneously moving the rods axially in opposite directions and other means operable independently of axial movement of the rods and regardless of the rotative position of the rods about the axis of the circle for moving the shiftable member from a gear ratio established position to its neutral position.

16. In control mechanism for a variable gear ratio transmission, a shiftable member for changing gear ratios, rotatable and axially movable selector members, means for axially moving the selector members simultaneously in opposite directions, means for selectively connecting the shiftable members to the selector members by a rotation of said selector members so that the shiftable member can be shifted to a gear ratio position upon axial movement of the selector members, means for rotating the selector members including a rotatable hub slidably receiving said selector members for rotation therewith about a common axis, and means for placing the shiftable member in a neutral position when no gear ratio is established independently of any axial movement of the selector members.

17. In control mechanism for a variable gear ratio transmission, a shiftable member for changing gear ratios, rotatable and axially movable selector members, means for axially moving the selector members simultaneously in opposite directions, means for selectively connecting the shiftable members to the selector members by a rotation of said selector members so that the shiftable member can be shifted to a gear ratio position upon axial movement of the selector members, means for rotating the selector members including a rotatable hub having circumferential slots slidably receiving a portion of said selector members for rotation therewith, and means operable by the manually operable member comprising a manually operated member for placing the shiftable member in a neutral position when no gear ratio is established independently of any axial movement of the selector members.

18. In control mechanism for a variable gear ratio transmission, a shiftable member having a neutral position and gear ratio establishing positions, rotatable selector members capable of axial movement in opposite directions, means for selectively connecting the selector members to the shiftable member by a rotation of said selector members to predetermined positions, means for rotating the selector members including a rotatable hub slidably receiving said selector members for rotation therewith about a common axis, means for moving the selector members in opposite direction to shift the shiftable member to a gear ratio established position, and means placing the shiftable member in its neutral position at will and independently of any axial movement of the selector members.

19. In control mechanism for a variable gear ratio transmission, a shiftable member having a neutral position and gear ratio establishing positions, rotatable selector members capable of axial movement in opposite directions, means for selectively connecting the selector members to the shiftable member by a rotation of said selector members to predetermined positions, means for rotating the selector members including a rotatable hub slidably receiving said selector members in interengaging relation for rotation therewith, means for moving the selector members to connecting positions and comprising a manually operable lever movable in opposite direction to shift the shiftable member to one of a pair of gear ratio established positions, and means placing the shiftable member in its neutral position at will by movement of the manually operable lever to a position other than any position assumed in selecting a gear ratio and independently of any axial movement of the selector members.

20. In a control mechanism for a variable gear ratio transmission, a shiftable member for changing gear ratios thereof, a rotatable cylindrical member provided with two axially extending grooves in its surface, means for rotating said cylindrical member, rods slidable in the grooves, said rods being provided with slots having a depth extending below the surface of the cylindrical member, means for moving the rods so that the slots are in circular alignment or are spaced apart axially of the cylindrical member, and a yieldable plunger having a rounded end and being carried by the shiftable member for engaging in a slot when opposite a rod containing the slot or for riding on the surface of the cylindrical member when the said member is rotated, said plunger when engaging a slot establishing a connection between the rod and the shiftable member so that upon axial movement of the rod the shiftable member will be shifted, said rods also being provided with shallow axially extending aligning grooves in their surfaces exposed above the surface of the cylindrical member in order to provide a guide seat for the rounded end of the plunger in event a rod is so axially positioned upon rotation of the cylindrical member that its slot cannot receive the plunger but rides up on the rod.

21. In a control mechanism for a variable lever ratio transmission, a shiftable member for changing gear ratios thereof, a rotatable cylindrical member having two axial grooves circumferentially spaced apart in its surface, rods in said grooves provided with cylindrical surfaces projecting above the surface of the cylindrical member, means for moving the rods simultaneously in opposite directions both inwardly and outwardly in said grooves, said rods in their inner positions having their inner ends overlapped and when in their outer positions having their inner ends spaced apart axially of the cylindrical member, a yieldable plunger having a rounded end and being carried by the shiftable member of the transmission, means for rotating the cylindrical member and rods so that the plunger can be radially aligned with either groove for reception in the groove and engageable by the inner end of the rod of said groove when the rods are caused to move from their outer positions to their inner positions, said rods being provided with axially extending shallow aligning grooves in their cylindrical surfaces which project above the surface of the cylindrical member for providing a guide seat for the rounded end of the plunger in the event the rods are in their inner positions when the cylindrical member is rotated so that a plunger is aligned with a groove.

22. In a control mechanism for a variable gear ratio transmission, a shiftable member for changing from one gear ratio to another and having a central neutral position, a rotatable cylindrical member having two axial grooves in its surface, rods in said grooves provided with slots, means for rotating the cylindrical member and rods, means for moving the rods simultaneously inwardly or outwardly, said rods when in their inner positions placing the slots therein in circular alignment, and a yieldable plunger carried by the shiftable member of the transmission, said plunger when the shiftable member is in neutral being selectively positionable in the rod slots by a rotation of the cylindrical member provided the rods are in their inner positions and thereby causing a selected gear ratio to be established when the rods are moved outwardly, said rods being of such length that when moved outwardly each inner end will be withdrawn from that portion of its groove which is circularly opposite the slot in the other slot and said inner end of each rod being provided with a bevel surface for accommodating relative movement of the rod beneath the plunger in the event the cylindrical member is rotated so that the plunger becomes positioned in the groove when the rod is in its outer position.

23. In a preselective control mechanism for a variable speed drive transmission having a shiftable member for establishing different speed drives, a yieldable plunger having a rounded end and being carried by the shiftable member, a plurality of cylindrical rods extending parallel to a common axis and arranged to have their axes in a circle about the single axis, at least two of said rods being provided with slots for receiving the plunger, means connecting together a group of the rods including one provided with a slot so as to be axially movable as a unit, means connecting another group of rods together including one provided with a slot so as to be axially movable as a unit, means for moving the groups of rods simultaneously inwardly and outwardly, said groups of rods when in their inner positions placing the slots in circular alignment, and means for rotating the groups of rods about the said single axis for positioning the said slotted rods for selective cooperation with said yieldable plunger, said last-mentioned means including a rotatable hub slidably receiving each of said groups of rods for rotation therewith about said single axis.

24. In a control mechanism for a variable gear ratio transmission having at least three different gear ratios, two shiftable members for establishing the gear ratios, two selector members, means selectively connecting the selectors to one shiftable member by a rotation of the selectors to predetermined positions, said selector members having a rotative neutral position where neither selector member is connected to the said one shiftable member, means for rotating the selectors including a shaft on which the selectors are axially movable in opposite directions, means for axially moving the selector members to establish either of two gear ratios, means for shifting the other shiftable member from a neutral position to a position establishing the remaining gear ratio, and interlocking means associated with the shaft and the other shiftable member and functioning to be effective to lock said other shiftable member in its neutral position when the shaft is rotated to cause a connection to be made between the first shiftable member and a selector member and also functioning to lock the shaft against rotation from the neutral position of the selector members when the said other shiftable member is moved to establish a gear ratio, said interlocking means including an elongated bar pivoted about its mid-point for constant contact with both of said shiftable members and having locking recesses locating the neutral positions of said members.

25. In a control mechanism for a variable gear ratio transmission having at least three different gear ratios, two shiftable members for establishing the gear ratios, two selector members, means selectively connecting the selectors to one shiftable member by a rotation of the selectors to predetermined positions, said selector members having a rotative neutral position where neither selector member is connected to the said one shiftable member, means for rotating the selectors including a hand lever and a shaft on which the selectors are axially movable in opposite directions, means for axially moving the selector members to establish either of two gear ratios, means for shifting the other shiftable member from a neutral position to a position establishing the remaining gear ratio by movement of the said hand lever and without rotation of the shaft, said hand lever when rotating the shaft being disconnected from the said other shiftable member, and interlocking means including an elongated bar mounted for tilting movement toward and away from said shiftable members, said bar having spaced locking recesses for retaining each of said members in neutral condition, whereby one of said members is always positioned in its locking recess to prevent movement of said one shiftable member when the other shiftable member is moved to establish a gear ratio.

26. In a control mechanism for a variable gear ratio transmission having at least three different gear ratios, two shifting forks for establishing the gear ratios, two selector members, means selectively connecting the selectors to one shifting fork by a rotation of the selectors to predetermined positions, said selector members having a rotative neutral position where neither selector member is connected to the said one shifting fork, means for rotating the selectors including a shaft on which the selectors are axially movable in opposite directions, means for axially moving the selector members to establish either of two gear ratios, a rod parallel with the shaft and slidably supporting the other of said forks, said other fork having a neutral position and a gear ratio established position, and an interlocking pin slidably carried by the other of the forks, said rod on which the other fork is slidable having a recess for receiving one end of the interlocking pin when the fork is in its neutral position and said shaft having a longitudinal groove for receiving the other end of the interlocking pin when the shaft is in a rotative position when the selector members are in their neutral position.

27. In preselective change speed transmission control, rotatable selector means comprising a cylindrical member provided with longitudinally extending circumferentially spaced surface grooves and cylindrical rods slidably received therein and having actuating shoulders thereon with a portion of their cylindrical surfaces projecting beyond the surface of the cylindrical member, a speed shifting member, a yieldable coupling plunger carried by said shifting member and adapted to engage in said grooves a predetermined depth for selective cooperation with a rod shoulder, means for axially sliding said rods for placing said shoulders in a common circular field for engaging the plunger or axially away from said common field, and means for rotating said selector means while the shoulders are axially away from the common field to select a future speed by first disengaging the plunger from the active groove and then causing the selector means to be in a position where the plunger can be engaged by a shoulder of a rod corresponding to the future speed desired.

28. In preselective change speed transmission control, rotatable selector means comprising a cylindrical member provided with a plurality of longitudinally extending circumferentially spaced surface grooves and cylindrical rods slidably received therein and having actuating shoulders thereon, said rods having a portion of their surface projecting above the surface of the cylindrical members, a speed shifting member, a yieldable coupling plunger carried by said shifting member, means for slidably positioning the rods axially for locating said actuating shoulders in circular alignment with or out of circular alignment with said plunger, said plunger being adapted for selective cooperation with said shoulders when in circular alignment therewith, and means for rotating said selectors for positioning said shoulders for selective cooperation with said coupling plunger.

29. In transmission control mechanism, a gear shifter, a spring actuated coupling plunger having a curved end carried thereby, rotatable selector means comprising a cylindrical member provided with a plurality of axially extending circumferentially spaced surface grooves and rods slidably received therein and having actuating shoulders thereon, the curved end of said plunger adapted to ride on the surface of the cylindrical member or on the rods at all times except when said plunger is engaged in a groove.

30. In transmission control mechanism, rotatable selector means comprising a cylindrical member provided with a plurality of axially extending circumferentially spaced surface grooves and rods slidably received therein and having actuating shoulders thereon with a surface of each rod projecting beyond the surface of the cylindrical member, a speed shifting member, a yieldable coupling plunger carried thereby and having a curved camming end adapted to be at all times against the surface of the cylindrical member or a rod except when engaged in a selected groove, said rods being axially shiftable to dispose said shoulders in circular alignment or in staggered circular relation with respect to the plunger, and means for disengaging said plunger from a selected groove and causing it to ride up onto a selected rod in two camming stages by a rotation of the selector means.

GLENN T. RANDOL.

REFERENCES CITED

The following references are of record in the file of this patent:

UNITED STATES PATENTS

| Number | Name | Date |
|---|---|---|
| 1,687,591 | Randol | Oct. 16, 1928 |
| 2,126,032 | Randol | Aug. 9, 1938 |
| 2,173,080 | Randol | Sept. 12, 1939 |
| 2,176,941 | Randol | Oct. 24, 1939 |
| 2,193,432 | Randol | Mar. 12, 1940 |
| 2,221,199 | Peo | Nov. 12, 1940 |
| 2,386,174 | Randol | Oct. 2, 1945 |